United States Patent

Higasayama et al.

[11] Patent Number: 5,923,561
[45] Date of Patent: Jul. 13, 1999

[54] PROCESS OF GENERATING A SUCCESSION OF DISCRETE POINTS DEFINING CUTTER PATH, BY CALCULATING A SPACE INTERVAL OF DISCRETE POINTS

[75] Inventors: Haruhisa Higasayama, Kasugai; Mitsuru Kubota, Toyota, both of Japan

[73] Assignee: Toyota Jidosha Kabushiki Kaisha, Toyota, Japan

[21] Appl. No.: 08/873,920

[22] Filed: Jun. 12, 1997

[30] Foreign Application Priority Data

Jun. 17, 1996 [JP] Japan .................................. 8-155659
May 22, 1997 [JP] Japan .................................. 9-132413

[51] Int. Cl.$^6$ .................................................. G05B 19/18
[52] U.S. Cl. .................................. 364/474.28; 364/474.3
[58] Field of Search ..................... 364/474.28–474.31, 364/474.24; 395/87; 318/570–573

[56] References Cited

U.S. PATENT DOCUMENTS

| 4,648,024 | 3/1987 | Kato et al. ........................ 364/474.29 |
| 5,416,716 | 5/1995 | Zeman et al. ...................... 364/474.29 |
| 5,444,636 | 8/1995 | Yoshida et al. ..................... 364/474.3 |

FOREIGN PATENT DOCUMENTS

| 0 530 032 | 3/1993 | European Pat. Off. . |
| 0 592 682 | 4/1994 | European Pat. Off. . |
| 195 07 148 | 10/1995 | Germany . |
| WO 95/10076 | 4/1995 | WIPO . |

*Primary Examiner*—William Grant
*Assistant Examiner*—Steven R. Garland
*Attorney, Agent, or Firm*—Oliff & Berridge, PLC

[57] ABSTRACT

A process of generating a succession of discrete points to be followed by a cutter, so as to move the cutter along a desired cutter path, including a step of calculating a space interval of the discrete points in the direction of the succession on the basis of a curvature radius of the desired cutter path, according to a relationship among the curvature radius, the space interval and movement velocity of the cutter, such that the movement velocity is enlarged as much as possible, and a step of generating the discrete points on the basis of the space interval, such that the discrete points are spaced apart from each other by a distance equal to the space interval in the direction of the succession.

20 Claims, 23 Drawing Sheets

3-D GRAPH REPRESENTATIVE OF MACHINING ABILITY

CALCULATION TO OBTAIN CURVE DEFINING EQUATIONS

GENERATION OF DISCRETE CUTTER PATH DEFINITION POINTS

RELATIONSHIP V-L WHEN CURVATURE RADIUS R TAKES A CERTAIN VALUE

CUTTER PATH CP

CURVATURE RADIUS = R

SPACE INTERVAL = L

TOLERANCE

R

PATTERN 1

PATTERN 2

PATTERN 3

PATTERN 4

PATTERN 5

GENERATION OF DISCRETE CUTTER PATH DEFINITION POINTS

AUXILIARY CUTTER MOVEMENT

UNNECESSARY ACCELERATION AND DECELERATION
IN CONVENTIONAL TECHNIQUE

COMMANDED MOVEMENT VELOCITY = 6 m/min

COMMANDED MOVEMENT VELOCITY = 12 m/min

COMMANDED MOVEMENT VELOCITY = 18 m/min

VARIATIONS IN VELOCITY IN VARIOUS COMMAND VALUES OF MOVEMENT VELOCITY

PROJECT METHOD

REVERSE-OFFSET METHOD

DISPOSITION OF DISCRETE POINTS ON CURVED LINE

PROCESS OF GENERATING A SUCCESSION OF DISCRETE POINTS DEFINING CUTTER PATH, BY CALCULATING A SPACE INTERVAL OF DISCRETE POINTS

The present application is based on Japanese Patent Applications No. 8-155659 filed in Jun. 17, 1996 and No. 9-132413 filed in May 22, 1997, the content of which is incorporated hereinto by reference.

CROSS REFERENCE TO RELATED APPLICATIONS

Not Applicable.

BACKGROUND OF THE INVENTION

1. Field of the Invention

The present invention relates in general to a process of generating cutter path data representative of a succession of discrete points which generally define a cutter path to be followed by a cutting tool or cutter for machining a workpiece.

2. Discussion of the Related Art

Generally, a manufacture of a desired part or product by machining a workpiece on an NC (numerically controlled) machine includes a CAD (computer aided design) data processing step, a CAM (computer aided manufacturing) data processing step, and an NC machining step, which are implemented in the order of description, as illustrated in FIG. 23.

At the CAD data processing step, part geometry data in the form of surface models and solid models which represent a desired cutting profile of the workpiece (i.e., a desired shape of the part) are generated according to commands generated by the operator of a CAD processor.

At the CAM data processing step, successive discrete points generally defining a cutter path are obtained by calculation on the basis of the part geometry data received by a CAM processor, so that a predetermined reference point of the cutter is moved through those discrete points at the subsequent NC machining step. The reference point of the cutter may be a center point of the cutter, for example. The cutter path defined by the discrete points (hereinafter referred to as "discrete cutter path definition points") is offset away from the desired cutting profile of the workpiece by a distance determined by the cutter configuration, in the normal direction of the desired cutting profile. For instance, the offset distance of the cutter path is determined by the radius of the cutter. At the CAM data processing step, cutter path data representative of the discrete cutter path definition points are then generated.

The CAM data processing step further includes a post-processing operation to convert the cutter path data to NC data (numerical control data) suitable for use in the subsequent NC machining step in which the workpiece is machined into the desired cutting profile. Generally, the NC data include cutter path data representative of the discrete cutter path definition points, and interpolation data indicative of either linear interpolation or circular interpolation of the adjacent discrete cutter path definition points. In the linear interpolation, the adjacent discrete points are connected by a straight segment. In the circular interpolation, the adjacent discrete points are connected by a circular arc segment.

At the NC machining step, cutter motion commands are prepared on the basis of the NC data supplied to a control device. The control device determines movement velocity of the cutter on the basis of a curvature radius of an approximate cutter path which is estimated from the succession of discrete points represented by the NC data, and a space interval of the discrete points, according to a predetermined relationship among the curvature radius, the space interval and the movement velocity. And then, the control device prepares the cutter motion commands, for successively supplying the cutter motion commands (for example, in the form of pulse signals) to the machine, so that the cutter is moved by a plurality of axes of the machine which are controlled by the control device at the determined movement velocity.

The control device determines the movement velocity of the cutter on the basis of a command value which is inputted into the control device by an operator of the machine in a case where the cutter is moved along a substantially straight portion of the cutter path, i.e., where the moving direction of the cutter is kept substantially constant. However, where the cutter is moved along a curved portion of the cutter path having a comparatively small radius of curvature, i.e., where the moving direction of the cutter is considerably changed, the cutter has to be sufficiently slowed down, so as to assure dimensional accuracy of the part manufactured. The control device has a function of controlling the movement velocity so as to optimize acceleration and deceleration in the movement of the cutter, for thereby increasing the movement velocity while assuring machining accuracy.

The velocity control performed by the control device includes a velocity variation control and a centrifugal acceleration control. The velocity variation control is for determining a resultant movement velocity of the cutter such that a variation in each feed rate of the cutter along the corresponding one of the controllable axes between two successive motions of the cutter corresponding to the successive motion commands is not excessively enlarged. The centrifugal acceleration control is for determining the resultant movement velocity of the cutter such that centrifugal acceleration of the cutter is not excessively enlarged even where the cutter is moved along a curved portion of the cutter path having a comparatively small radius of curvature.

Thus, the cutter is automatically accelerated and decelerated by the velocity variation control and the centrifugal acceleration control, depending upon dispositions of the discrete points to be followed by the cutter, as shown in FIG. 24. The machine receives the cutter motion commands including data representative of the thus determined movement velocity of the cutter, from the control device, so that the machine is operated to move the cutter along the cutter path according to the cutter motion commands, for thereby machining the workpiece into the desired cutting profile.

As is apparent from the above description, a series of steps to machine the workpiece into the desired cutting profile includes a data processing operation for generating the discrete cutter path definition points generally defining the cutter path to be taken by the cutter. This data processing operation is implemented after the part geometry data are prepared and before the cutter motion commands are generated. In the example of FIG. 23, the data processing operation in question is the operation to obtain the discrete cutter path definition points by calculation in the CAM data processing step.

At the conventional CAM data processing step, the discrete cutter path definition points are determined on the basis of the desired cutting profile of the workpiece, and a predetermined tolerance which is a permissible maximum amount of deviation of the cutter path generally defined by the succession of discrete points, from a desired cutter path which exactly follows the desired cutting profile, as indicated in FIG. 25. The desired cutter path generally defined by the discrete points consists of straight segments which connect the adjacent discrete points. That is, the desired cutter path is approximated by the discrete points, so as to minimize the required volume of the cutter path data while assuring a minimum sufficient degree of NC machining accuracy of the workpiece (dimensional accuracy of the part manufactured).

At the conventional step as described above, the requirement for reducing the volume of the cutter path data may be satisfied while assuring a satisfactory degree of the NC machining accuracy. However, there are other requirements in the NC machining, such as a requirement for increasing the movement velocity, which requirement is not sufficiently satisfied by the conventional method.

If the cutter could be moved along an ideal cutter path which is deviated from the desired cutter path by substantially zero, the cutter would not have to be decelerated and accelerated except where the cutter is being moved just before and immediately after turning points of the cutter path, as indicated by a broken line in a graph of FIG. 26B. However, it is impossible to move the cutter exactly along the ideal cutter path. Actually, the cutter is moved along the approximate cutter path defined by straight lines connecting the discrete cutter path definition points which are intended to approximate to the desired cutter path. Thus, the cutter is unnecessarily accelerated and decelerated by the velocity variation control and the centrifugal acceleration control as shown in FIG. 26B.

For increasing the movement velocity, it is preferable that the unnecessary acceleration and deceleration should be prevented. However, in a case where the discrete cutter path definition points are generated only so as to meet a requirement that an amount of deviation of the approximate cutter path defined by the succession of discrete points from the desired cutter path should not be larger than a predetermined tolerance, the unnecessary acceleration and deceleration are not sufficiently prevented. In that case, even if the operator commands the control device to enlarge the movement velocity of the cutter, a frequency and a largeness of the acceleration and deceleration are increased as shown in FIGS. 27A, 27B and 27C, resulting in impossible to increase the movement velocity. Thus, the conventional technique suffers from a drawback arising from the incapability to satisfy the requirement for increasing the movement velocity while assuring the satisfactory NC machining accuracy.

A research conducted by the inventors of the present invention has indicated an importance of taking account of machining ability which is associated with movement velocity of the cutter and which varies from machine to machine, at the step of generating or determining the discrete cutter path definition points.

SUMMARY OF THE INVENTION

It is therefore an object of the present invention to provide a process of generating discrete cutter path definition points, by taking account of the machining ability as a property of the machine, which permits optimization of the cutter path so as to meet the NC machining requirement for increasing the movement velocity of the cutter during the NC machining.

The object may be achieved according to the following modes of the invention, which are numbered as in the claims, so as to indicate possible combinations of features of the two or more modes of the invention.

(1) A process of generating a succession of discrete points to be followed by a cutter, so as to move the cutter along a desired cutter path, comprising:
 (a) a step of calculating a first space interval of the discrete points in the direction of the succession on the basis of a curvature radius of the desired cutter path, according to a relationship among the curvature radius, the first space interval and movement velocity of the cutter, such that the movement velocity is enlarged as much as possible; and
 (b) a step of generating the discrete points on the basis of the first space interval, such that the discrete points are spaced apart from each other by a distance equal to the first space interval in the direction of the succession.

In the process according to the mode (1), the space interval of the discrete points is calculated on the basis of the relationship among the curvature radius of the cutter path, the space interval of the discrete points and the movement velocity of the cutter. The relationship represents the machining ability of the individual machine. That is, in the above process, the space interval is calculated by taking account of the machining ability, such that the movement velocity is enlarged as much as possible.

In the conventional process of generating the succession of discrete points, the predetermined tolerance of deviation of the approximate cutter path defined by the succession of discrete points from the desired cutter path is taken into account for the generation, as described above. Generally, in the conventional process, the amount of the deviation of the cutter path defined by the generated points from the desired cutter path tends to be much smaller than the predetermined tolerance. It is impossible to design a software for generating the discrete points by practicing the conventional process such that the amount of the deviation substantially corresponds to the predetermined tolerance. As a result, an excessively large number of discrete points are generated. In the above process according to the first aspect, on the other hand, a reduced number of discrete points are generated, since the space interval is determined by taking account of the curvature radius upon the generation of the discrete points.

The term "space interval of the discrete points" is generally interpreted to mean a length of each of the straight lines of the approximate cutter path defined by the discrete points, but may be interpreted to mean a length of each of curved lines of a nominal cutter path on which the discrete points are located.

To "enlarge the movement velocity as much as possible" is not only interpreted to mean that the movement velocity takes the substantially maximum value, but also interpreted to mean that the movement velocity takes a value close to the maximum value (for example, a value equal to or more than 80% of the maximum value) under a condition defined by a relationship between the space interval and the movement velocity wherein the curvature radius takes a particular value. The relationship between the space interval and the movement velocity is expressed by a two-dimensional graph which is shown in FIG. 9B. This two-dimensional graph is equivalent to a cross-section of a three-dimensional graph which is shown in FIG. 9A. The cross-section is taken along a plane on which the curvature radius R takes the calculated value.

(2) A process according to the mode (1), wherein the step of calculating the first space interval includes: (a) a step of obtaining at least one provisional value on the basis of the curvature radius of the desired cutter path and according to the relationship; and (b) a step of determining the at least one provisional value as a definitive space interval of the discrete points in the direction of the succession, where the at least one provisional value consists of a single value, and determining one of the at least one provisional value, which satisfies a predetermined condition, as a definitive space interval, where the at least one provisional value consists of a plurality of values.

FIG. 14 shows one example where the provisional value consists of a single value, while FIG. 11 shows one example where the provisional value consists of a plurality of values. The term "one which satisfies a predetermined condition" may be interpreted to mean the maximum value, the minimum value or the intermediate value of the plurality of values.

(3) A process according to the mode (1) or (2), wherein the succession of discrete points are to be followed by a reference point of the cutter during movement of the cutter, the reference point being spaced from a cutting point of the cutter, and wherein the step of calculating the first space interval comprises a step of calculating the curvature radius on the basis of at least a desired cutting profile into which a workpiece is to be machined with the cutter being moved along the desired cutter path, and optionally a cutter path definition plane which is defined by a reference line passing through both of the reference point and the cutting point during the movement of the cutter, and a cutter size which represents the distance between the reference point and the cutting point.

The term "cutter" in the above process may be interpreted to mean an end mill. The "reference point of the cutter" may be interpreted to mean the center of the end mill. The "cutter size representing the distance between the reference point and the cutting point" may be interpreted to mean a radius of the end mill.

(4) A process according to the mode (3), wherein the step of calculating the curvature radius comprises: (a) a step of calculating the desired cutter path on the basis of the desired cutting profile, the cutter path definition plane and the cutter size; and (b) a step of calculating the curvature radius on the basis of the desired cutter path.

(5) A process according to the mode (3), wherein the step of calculating the curvature radius includes: (a) a step of calculating an intersection line of the desired cutting profile and the cutter path definition plane; and (b) a step of calculating, as the curvature radius of the desired cutter path, a curvature radius of a segment of the intersection line on which segment a predetermined point is located.

In this process, an approximate value of the curvature radius of the desired cutter path is calculated without utilizing the value of the desired cutter path, based upon the assumption that a curvature radius of a segment on which a predetermined point is located and which is a part of the intersection line of the desired cutting profile and the cutter path definition plane approximates to the value of the curvature radius of the desired cutter path.

(6) A process according to the mode (3), wherein the step of calculating the curvature radius comprises: (a) a step of calculating a offset plane which is offset away from the desired cutting profile by the distance in the normal direction of the desired cutting profile, on the basis of the desired cutting profile and the cutter size; and (b) a step of calculating an intersection line of the offset plane and the cutter path definition plane, and calculating a curvature radius of a segment of the intersection line on which segment a predetermined point is located, as the curvature radius of the desired cutter path.

In this process, an approximate value of the curvature radius of the desired cutter path is calculated without utilizing data representative of the desired cutter path, based upon the assumption that a curvature radius of a segment on which a predetermined point is located and which is a part of the intersection line of the offset plane and the cutter path definition plane approximates to the curvature radius of the desired cutter path.

(7) A process according to any one of the modes (1)–(6), wherein the succession of discrete points is to be followed by a reference point of the cutter during movement of the cutter, the reference point being spaced from the cutting point of the cutter, and wherein the step of generating the discrete points includes a step of generating the discrete points on a offset plane, the offset plane being is offset away from a desired cutter profile into which a workpiece is to be machined with the cutter being moved along the desired cutter path, in the normal direction of the desired cutter profile by a distance between the reference point and the cutting point.

(8) A process according to any one of the modes (1)–(6), wherein the succession of discrete points is to be followed by a reference point of the cutter during movement of the cutter, the reference point being spaced from the cutting point of the cutter, and wherein the step of generating the discrete points includes: (a) a step of generating the discrete points on a desired cutter profile into which a workpiece is to be machined with the cutter being moved along the desired cutter path; and (b) a step of offsetting the generated discrete points away from the desired cutting profile in the normal direction of the desired cutting profile by a distance between the reference point and the cutting point.

(9) A process according to any one of the modes (1)–(8), wherein the succession of discrete points is to be followed by a reference point of the cutter during movement of the cutter, the reference point being spaced from the cutting point of the cutter, and wherein the step of generating the discrete point includes:

(a) a step of calculating the desired cutter path or a path approximate to the desired cutter path, on the basis of at least a desired cutting profile into which a workpiece is to be machined with the cutter being moved along the desired cutter path, and optionally a cutter path definition plane which is defined by a reference line passing through both of the reference point and the cutting point during the movement of the cutter, and a cutter size which represents the distance between the reference point and the cutting point; and (b) a step of generating the discrete points on the calculated path such that the discrete points are spaced apart from each other by a distance equal to the first space interval in the direction of the succession.

(10) A process according to any one of the modes (1)–(8), wherein the succession of discrete points is to be followed by a reference point of the cutter during the movement of the cutter, the reference point being spaced from a cutting point of the cutter, and wherein the step of generating the discrete points is performed without calculating the desired cutter path, the step of generating the discrete points comprising:

(a) a step of determining a position of a first point which is one of the discrete points and which is to be first generated;

(b) a step of determining the first point as a start point of a first pair of points which is one of a plurality of pairs of points and which is to be first generated, the plurality of pairs of points constituting the discrete points, each of the pair of points consisting of adjacent two of the discrete points;

(c) a step of generating an end point of the first pair of points, on the basis of the position, the first interval and the direction of the succession; and (d) a repeat step of determining an end point of each one of the plurality of pairs of points, as a start point of the subsequent pair of points, and generating an end point of the subsequent pair of points, on the basis of a position of the start point of the subsequent pair of points, the first interval and the direction of the succession, the repeat step being repeatedly implemented.

In this process, the plurality of discrete points are successively generated, without calculating the desired cutter path prior to the generation of the points. The space interval of each pair of points is calculated by taking account of the machining ability of the machine, i.g., the above-described relationship of the machine.

(11) A process according to the mode (10), further comprising a step of determining the direction of the succession on the basis of at least the position and a desired cutting profile into which a workpiece is to be machined with the cutter being moved along the desired cutter path, and optionally a cutter path definition plane which is defined by a reference line passing through both of the reference point and the cutting point during the movement of the cutter, and a cutter size which defines the distance between the reference point and the cutting point.

(12) A process according to any one of the modes (1)–(11), wherein the movement velocity is determined on the basis of the curvature radius and the first space interval which are estimated from the discrete points, according to the relationship, and wherein data representative of the discrete points and the movement velocity are supplied to control devices, so that the cutter is moved at the movement velocity by a machine which is controlled by the control devices.

In this process, since the machining ability represented by the relationship is taken into account for calculating the space interval at the step of generating the discrete points which are subsequently processed into the NC data used in the NC machining step, the cutter is not unnecessarily accelerated and decelerated by the control device. Thus, the present preferred form is effective to easily increase the movement velocity of the cutter for machining the workpiece.

(13) A process according to any one of the modes (1)–(12), further comprising:

(a) a step of determining the first space interval as a first candidate value;

(b) a step of calculating a second space interval of the discrete points in the direction of the succession such that a amount of deviation of an approximate cutter path from the desired cutter path is held equal to or smaller than a predetermined permissible maximum amount, the approximate cutter path being defined by straight lines interpolating the discrete points;

(c) a step of determining the second space interval as a second candidate value; and (d) a step of determining one of the first and second candidate values, which is smaller than the other, as an optimum space interval of the discrete points in the direction of the succession.

In this process, the first candidate value is calculated by taking account of the relationship while the second candidate value is calculated by taking account of the amount of deviation of the cutter path generally defined by the succession of discrete points from the desired cutter path which exactly follows the desired cutting profile. Then, one of the first and second candidate values, which is smaller than the other, is determined as the optimum space interval of the discrete points in the direction of the succession. Therefore, the present preferred form is effective to assure the machining accuracy while increasing the movement velocity of the cutter for machining the workpiece.

(14) A process according to any one of the modes (1)–(13), wherein the relationship is determined on the basis of a plurality of different conditions associated with the movement velocity of the cutter.

(15) A process according to the mode (14), the different conditions include a first condition that a resultant movement velocity of the cutter be determined with the curvature radius as a variable such that an actual centrifugal acceleration of the cutter during movement thereof is held equal to or smaller than an upper limit of the actual centrifugal acceleration.

(16) A process according to any one of the modes (14) and (15), the different conditions include a second condition that the movement velocity of the cutter be determined with the space interval as a variable, by taking account of data processing ability of the control device.

In the present process, the term "movement velocity of the cutter" may be interpreted to mean any one of the resultant movement velocity of the cutter and each of the feed rates of the cutter along a corresponding one of the controllable axes.

(17) A process according to any one of the modes (14)–(16), wherein the cutter is moved by a machine having a plurality of controllable axes, and wherein the different conditions include a third condition that the resultant movement velocity of the cutter be determined with the curvature radius and the space interval as variables such that a variation in each feed rate of the cutter along a corresponding one of the controllable axes is held equal to or smaller than an upper limit of the variation, the variation being an amount of change in the feed rate of the cutter between two successive motions of the cutter corresponding to two successive motion commands.

(18) A process according to any one of the modes (14)–(17), wherein the different conditions include a fourth condition that the movement velocity of the cutter be determined such that the resultant movement velocity is held equal to or smaller than a command value which is inputted into the control device by an operator of the machine.

(19) A process according to any one of the modes (1)–(18), further comprising a step of obtaining curve defining functional equations representative of curves each of which defines the desired cutter path on the basis of a desired cutting profile into which a workpiece is to be machined with the cutter being moved along, and wherein the discrete points are generated on the basis of the functional equations and the first space interval of the discrete points.

As conventional methods of obtaining the cutter path on the basis of the desired cutting profile, there are a project method and a reverse-offset method which are well-known in the art, as shown in FIGS. 28 and 29, respectively. In the project method, it is supposed that there are a plurality of identical cutters which are arranged such that the cutters are equally spaced apart from each other by a predetermined interval as viewed from the horizontal direction in the figure, and such that the spherical surface of each of the cutters is tangent to the surface of the desired cutting profile. In this method, a plurality of straight lines each of which connects the reference points of adjacent two of the cutters are determined as the cutter path.

In the reverse-offset method, the plurality of identical cutters are conceptually arranged such that the cutters are equally spaced apart from each other by a predetermined interval as viewed from the horizontal direction in the figure, as in the project method. But, in the reverse-offset method, each of the cutters is disposed such that one of the axially opposite ends having the spherical surface projects upwards, and such that the reference point is held on the surface of the desired cutting profile. And then, it is supposed that there are a plurality of planes (represented by broken lines vertically extending in the figure) which are equally spaced apart from each other by a predetermined interval as viewed from the horizontal direction. In this method, a plurality of straight lines each of which connects adjacent two of intersection points between the spherical surfaces of the cutters and the planes are determined as the cutter path.

However, the above methods suffer from the following drawbacks. First, the interval between each adjacent two of the cutters is not necessarily equal to the shortest distance (space interval) between the reference points of the adjacent cutters in the project method, while the interval between each adjacent two of the planes is not necessarily equal to the shortest distance (space interval) between the corresponding adjacent two of the intersection points in the reverse-offset method. Secondly, it is impossible to take into account of the variation in the curvature radius of the desired cutting profile, upon determining the interval between the cutters or the planes. Thirdly, where the interval of the cutters is larger than the interval of the planes in the reverse-offset method, as shown in FIG. 29, some of the intersection points are considerably deviated from a curved plane which is precisely offset from the desired cutting profile by a distance equal to a radius of the cutter. Consequently, the cutter path obtained through the above methods is not likely to accurately follow the desired cutting profile.

In the process defined in the above mode (19), on the other hand, the space interval of the discrete points can be freely determined, making it possible to generate the discrete points such that the discrete points are spaced apart from each other by an optimum space interval. Further, since all the discrete points generated in the present process are located on the curved plane which is precisely offset from the desired cutting profile, the cutter path obtained in the present process accurately follows the desired cutting profile. Thus, the present process is effective to thereby increase the movement velocity of the cutter for machining the workpiece while assuring machining accuracy.

(20) A process according to the mode (19), wherein the step of obtaining the curve defining functional equations includes: (a) a step of calculating a first cutter path definition plane on the basis of data representative of the desired cutting profile and data representative of a radius of the cutter, the first cutter path definition plane being offset by a distance determined by the radius, away from the desired cutting profile in the normal direction of the desired cutting profile, (b) a step of calculating a plurality of second cutter path definition planes which intersect the first cutter path definition plane and which cooperate with the first cutter path definition plane to provide a plurality of intersection lines therebetween; and (c) a step of obtaining curve defining functional equations representative of the intersection lines as a plurality of desired cutter paths.

In this process, the "second cutter path definition planes" may be flat planes or curved planes.

(21) A process according to the mode (19), wherein the step of obtaining the curve defining functional equations includes: (a) a step of calculating cross sectional profiles of a part to be manufactured by machining of the workpiece, in a plurality of flat or curved planes, on the basis of data representative of the desired cutting profile; and (b) a step of obtaining a plurality of provisional discrete points on the basis of data representative of a radius of the cutter, and obtaining curve defining equations on the basis of the obtained provisional discrete points, the plurality of provisional discrete points being offset by a distance determined by the radius, away from the desired cutting profile in the normal direction of the desired cutting profile.

(22) A medium having a computer program for executing a process defined in any one of the modes (1)–(21), such that the computer program is readable by a computer.

The data storage medium stores the program for generating the discrete points which are suitable for increasing the movement velocity of the cutter during the NC machining. Thus, the movement velocity can be efficiently increased, by executing the program through the computer.

The data storage medium may be a floppy disk, a magnetic tape, a magnetic disk, a magnetic drum, a magnetic card, an optical disk, a magneto-optical disk, a CD-ROM, or an IC card.

(23) A process according to any one of the modes (1)–(22), wherein the cutter is moved by a machine, the process further comprising a step of determining the relationship such that the relationship satisfies a plurality of different conditions associated with the movement velocity of the cutter, the relationship representing machining ability of the machine.

BRIEF DESCRIPTION OF THE DRAWINGS

The above and optional objects, features, advantages and technical and industrial significance of this invention will be better understood by reading the following detailed description of presently preferred embodiments of the invention, when considered in connection with the accompanying drawings, in which.

DETAILED DESCRIPTION OF THE PREFERRED EMBODIMENT

Figure 1:
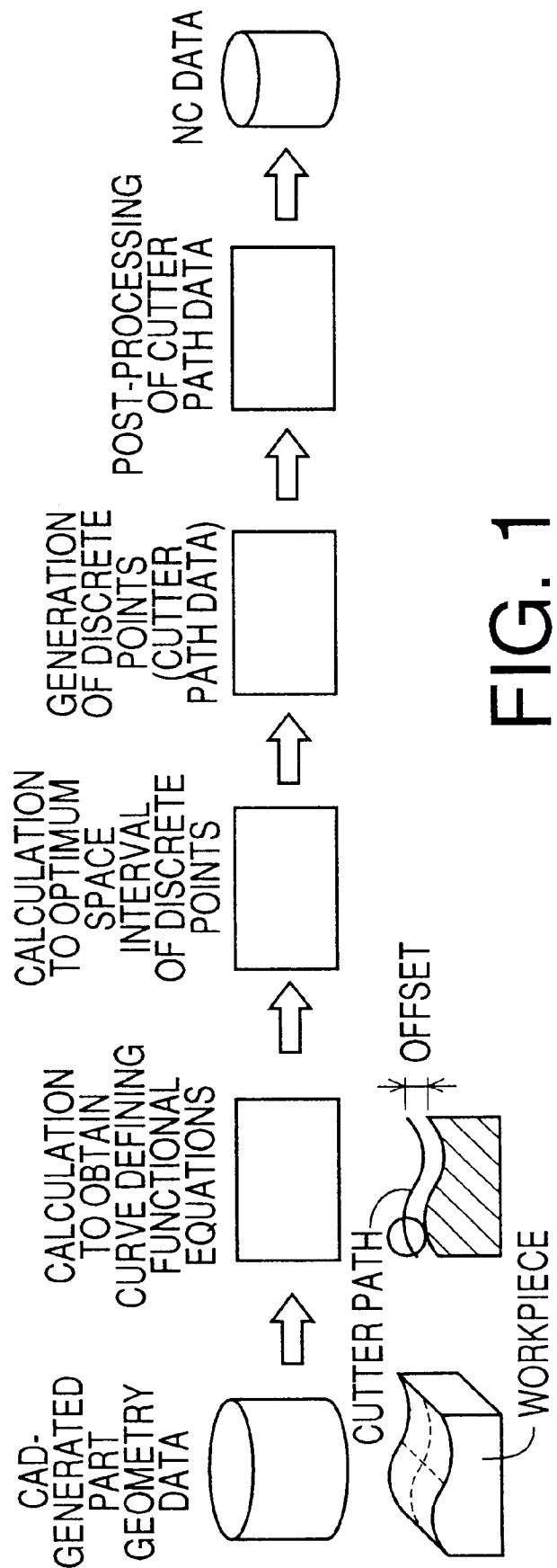
FIG. 1 is a view schematically showing steps of a process of generating discrete cutter path definition points according to a first embodiment of the present invention.

Referring to the drawings, there will be described a first embodiment of this invention, which is applicable to a CAM data processing step shown in FIG. 23 adapted to perform an NC machining operation on a workpiece with a cutter in the form of an end mill.

First, the present embodiment will be briefly explained.

In the CAM data processing step, a series of operations are performed as shown in FIG. 1. Initially, a CAM processor receives part geometry data such as surface models or solid models, which have been generated in a CAD data processing step. Then, calculating operations are performed on the basis of the part geometry data and cutter geometry data including data representative of a radius of the cutter, to obtain curve defining functional equations (hereinafter referred to as "curve defining equations") representative of curves which generally define a desired cutter path along which a reference point (e.g., the center point) of the cutter should be moved. Subsequently, for generating a succession of discrete cutter path definition points on the desired cutter path, optimum space intervals between adjacent two of the discrete points are determined on the basis of the curve defining equations, and thereby the discrete points are generated on the desired cutter path such that the adjacent two of the discrete points are spaced apart from each other by the optimum space intervals in the direction of the succession. Then, cutter path data representative of the discrete points are calculated. The cutter path data are subjected to a post-processing operation, whereby NC data corresponding to the cutter path data are generated. The thus obtained NC data can be processed by a DNC (direct numerical control device) 10 shown in FIG. 23.

In the NC machining step, a machine 14 is controlled by a CNC (computerized numerical control device) 12 which receives the NC data from the DNC 10, such that a cutter 16 and a workpiece 18 are moved relative to each other, to machine the workpiece 18 into a desired cutting profile.

The machine 14 has a plurality of axes controlled by the DNC 10 and the CNC 12. The DNC 10 and the CNC 12 control the plurality of axes to move the cutter 16 relative to the workpiece 18 according to a predetermined relationship among a curvature radius of the desired cutter path, the space interval and velocity of the movement.

The relationship is determined on the basis of a plurality of different conditions associated with the movement velocity of the cutter 16. The plurality of conditions include first, second, third and fourth conditions. The first condition is that a resultant movement velocity of the cutter 16 should be determined such that an actual centrifugal acceleration of the cutter 16 during its movement is not larger than an upper limit of the actual centrifugal acceleration. The first condition is expressed by the following equation;

$$V \leq f_1(R) \leq \sqrt{(G_P)} \times \sqrt{(R)}$$

wherein

V; resultant movement velocity

R; curvature radius (variable) of cutter path $G_P$; upper limit (constant) of actual centrifugal acceleration.

The curvature radius of the cutter path is calculated by the CNC 12 on the basis of the NC data supplied thereto from the DNC 10. Since the NC data do not directly represent the cutter path but represent the discrete cutter path definition points, the CNC 12 conceptually defines a continuous path approximate to the cutter path on the basis of the discrete points, for thereby calculating the curvature radius on the basis of the continuous path. Described more specifically, the continuous path is an arc which passes through successive three of the discrete points, and a radius of the arc is determined as the curvature radius.

The second condition is that the resultant movement velocity of the cutter 16 should be determined by taking account of data processing ability of the control devices in the form of the DNC 10 and the CNC 12. The second condition is expressed by the following equation;

$$V \leq f_2(L) \leq \text{MIN}(L \div t,\ b \times L \div B)$$

wherein

V; resultant movement velocity

L; space interval (variable) of discrete points b; maximum data amount (constant) which can be transferred from DNC 10 to CNC 12 in a predetermined time B; data amount (constant) of one line of NC data which are transferred from DNC 10 to CNC 12 t; time (constant) required for processing data amount corresponding to one motion of cutter 16.

The third condition is that the resultant movement velocity of the cutter 16 should be determined such that a variation in each feed rate of the cutter 16 along a corresponding one of the controllable axes is not larger than an upper limit of the variation. The variation is an amount of change in the feed rate of the cutter between two successive motions of the cutter. The third condition is expressed by the following equation;

$$V \leq f_3(R,L) \leq \Delta V_P \div \sin\{2 \times \sin^{-1}(L \div 2 \times R)\}$$

wherein

V; resultant movement velocity

R; curvature radius (variable)

L; space interval (variable)

$\Delta V_P$; upper limit (constant) of variation in feed rate

The fourth condition is that the resultant movement velocity of the cutter 16 should be determined such that the resultant movement velocity is not larger than a command value which is inputted into the DNC 10 or CNC 12 by an operator of the machine. The fourth condition is expressed by the following equation;

$$V \leq f_4 \leq V_D$$

wherein

V; resultant movement velocity $V_D$; command value (constant)

Figure 2:
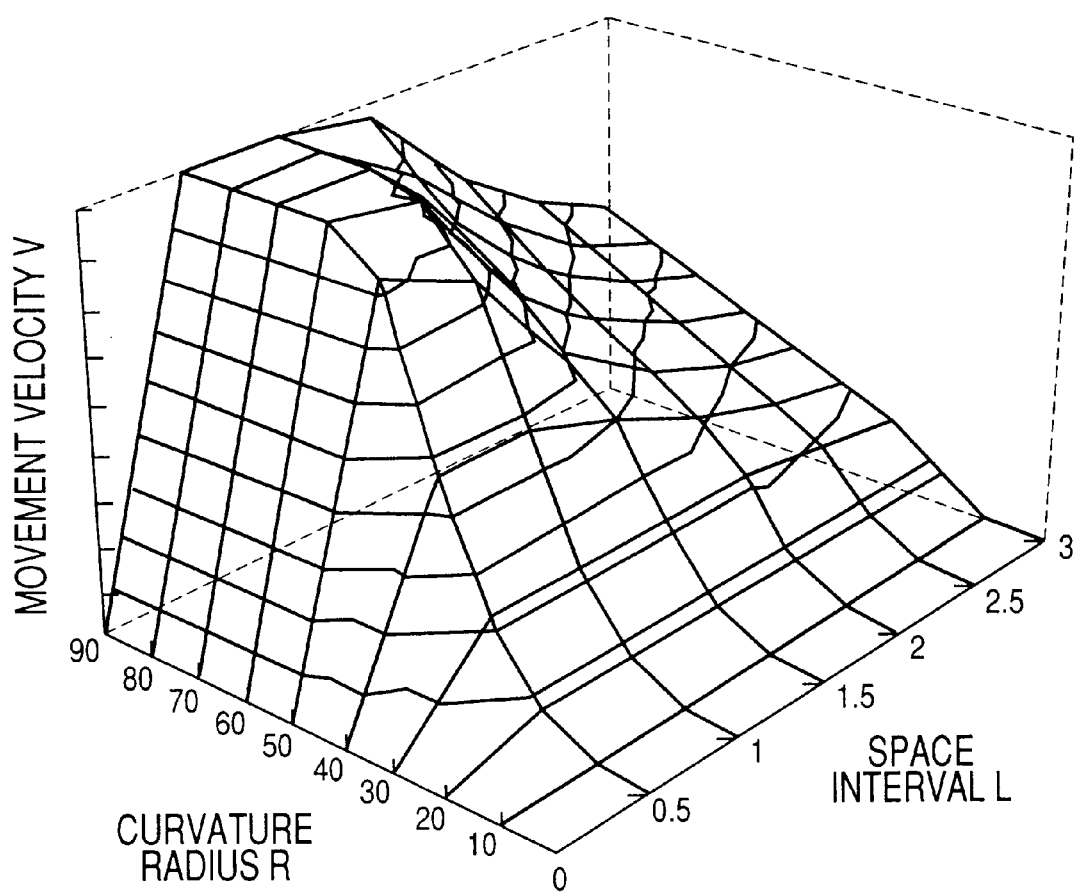
FIG. 2 is a three-dimensional graph showing machining ability of a NC machine controlled by control devices to which data representative of the discrete cutter path definition points are supplied.

The CNC 12 calculates maximum values of the resultant movement velocity corresponding to the respective four conditions described above, according to the above-described four equations. Then, the CNC 12 determines one of the four maximum values which is smaller than the others as an optimum movement velocity, so as to supply a pulse signal representative of a motion command to the machine 14, so that the cutter 16 is moved at the optimum movement velocity by the machine 14. The relationship among the thus determined optimum movement velocity, the curvature radius and the space interval can be expressed by a three-dimensional graph as shown in FIG. 2.

The present embodiment of the invention will be described in detail.

Figure 3:
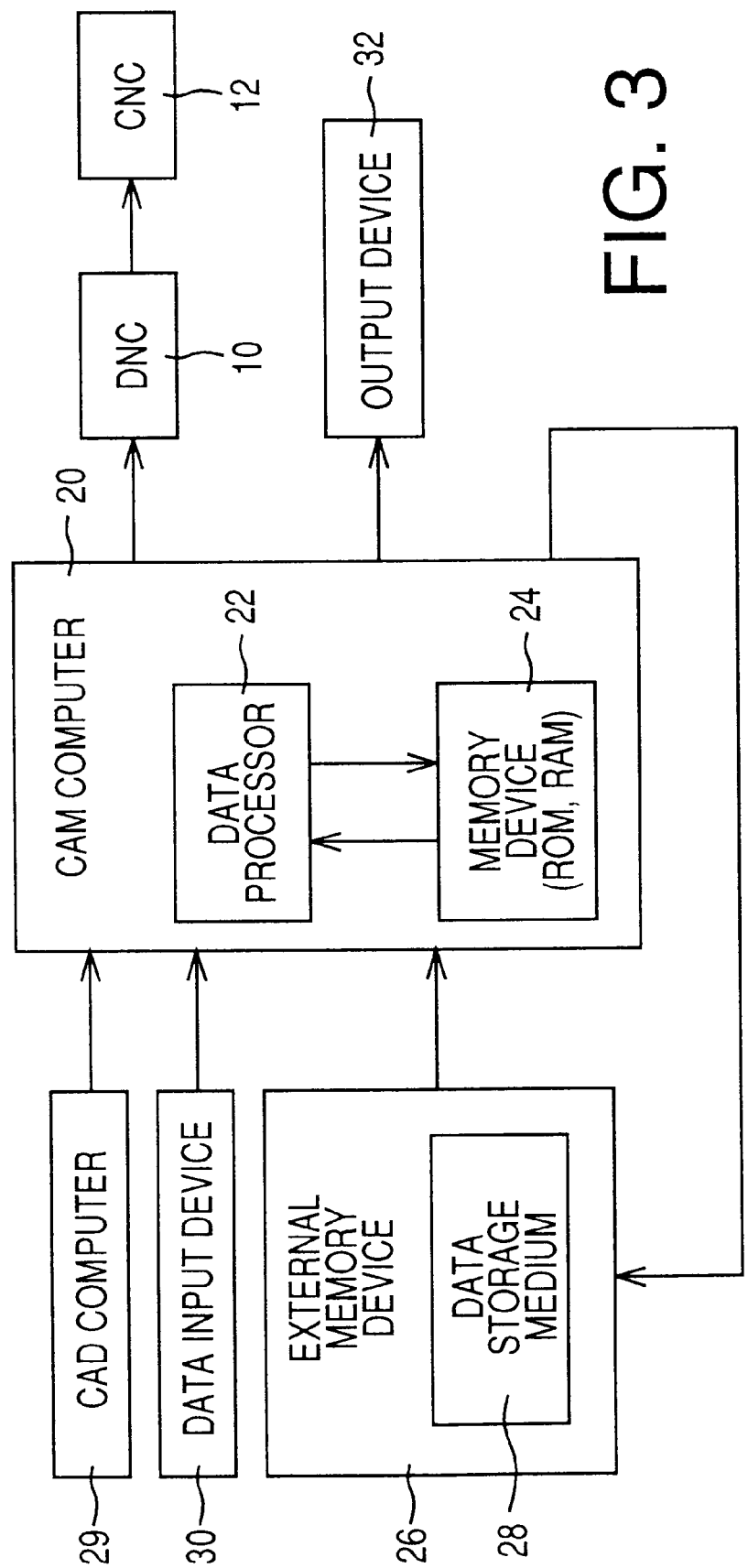
FIG. 3 is a block diagram showing a cutter path data generating apparatus suitable for practicing the process of the invention.
Figure 23:
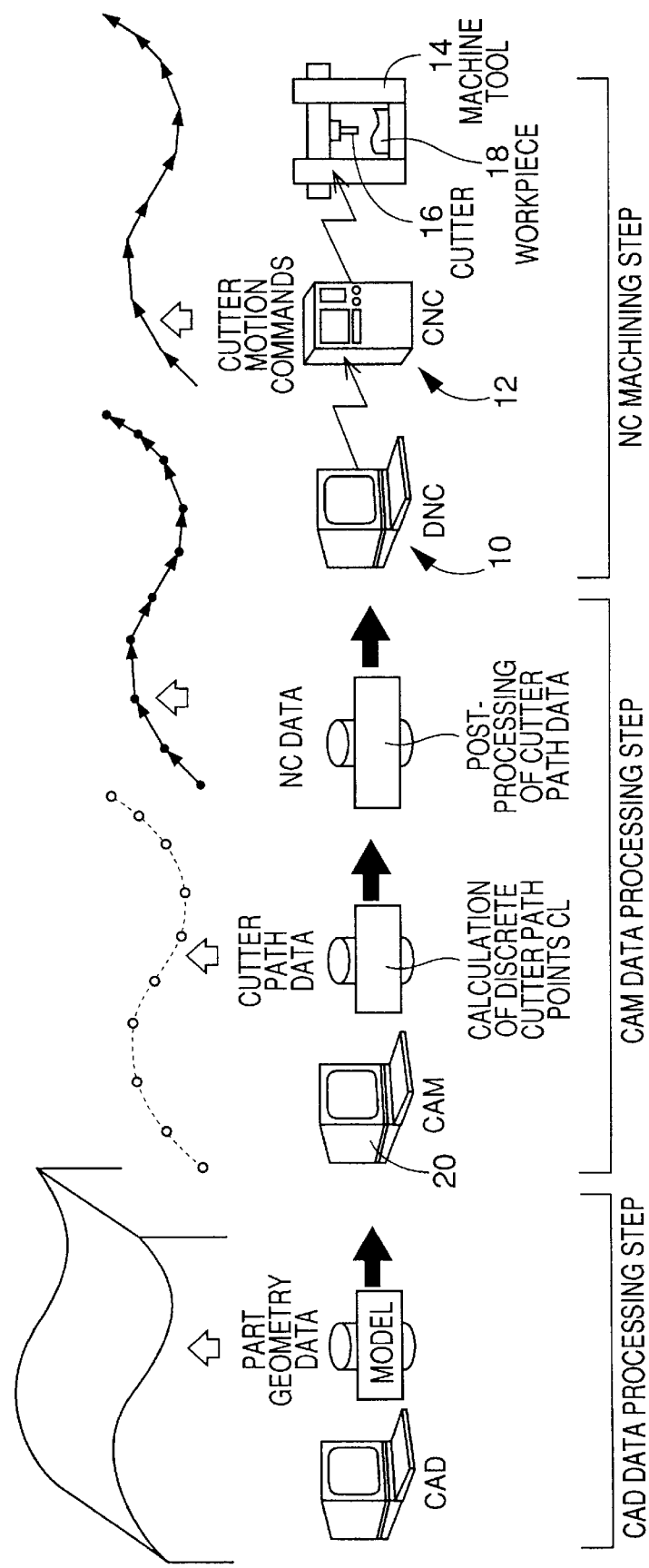
FIG. 23 is a view showing a series of steps of a process of machining a workpiece on a NC machine.
Figure 24:
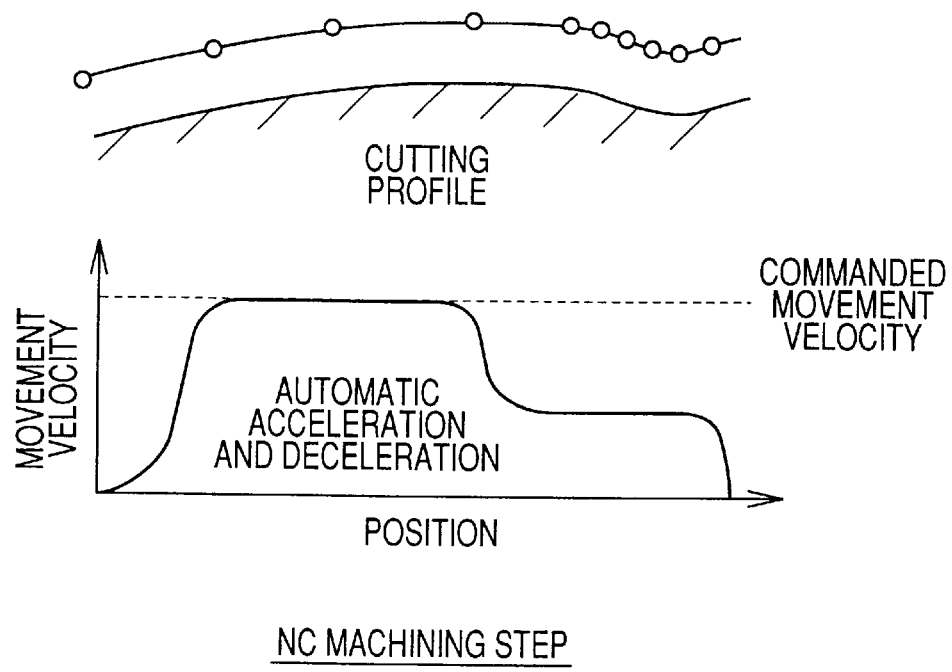
FIG. 24 is a view for explaining a velocity control performed at a NC machining step of FIG. 23.
Figure 25:
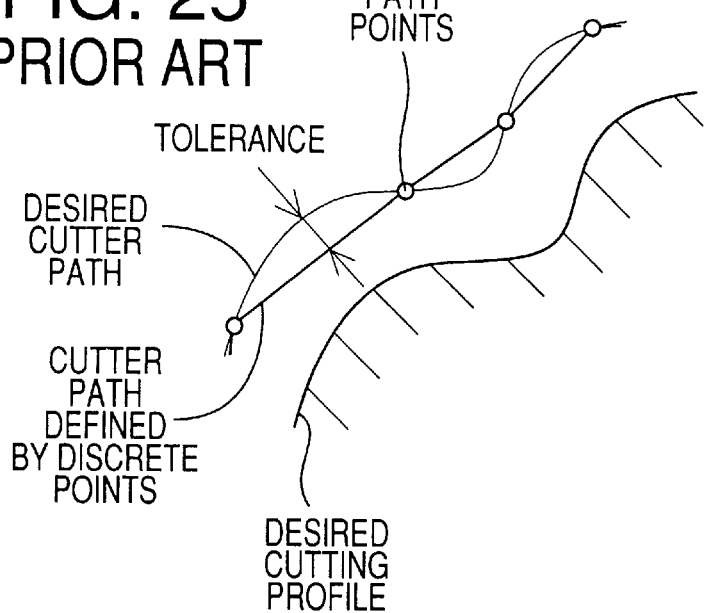
FIG. 25 is a view for explaining a conventional technique for defining a cutter path by the discrete cutter path definition points.
Figure 26A:
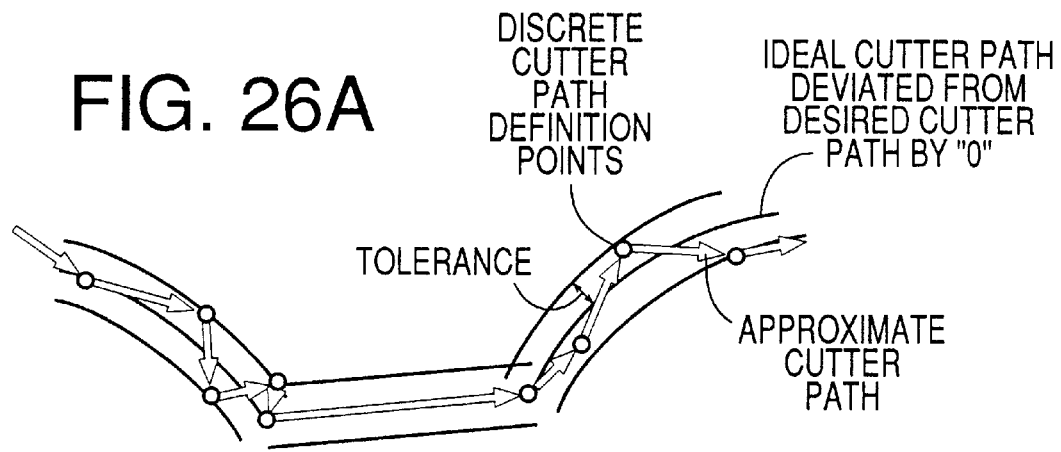
FIG. 26A is a view showing a difference between an ideal cutter path and an approximate cutter path which is defined by the discrete cutter path definition points through the conventional technique.
Figure 26B:
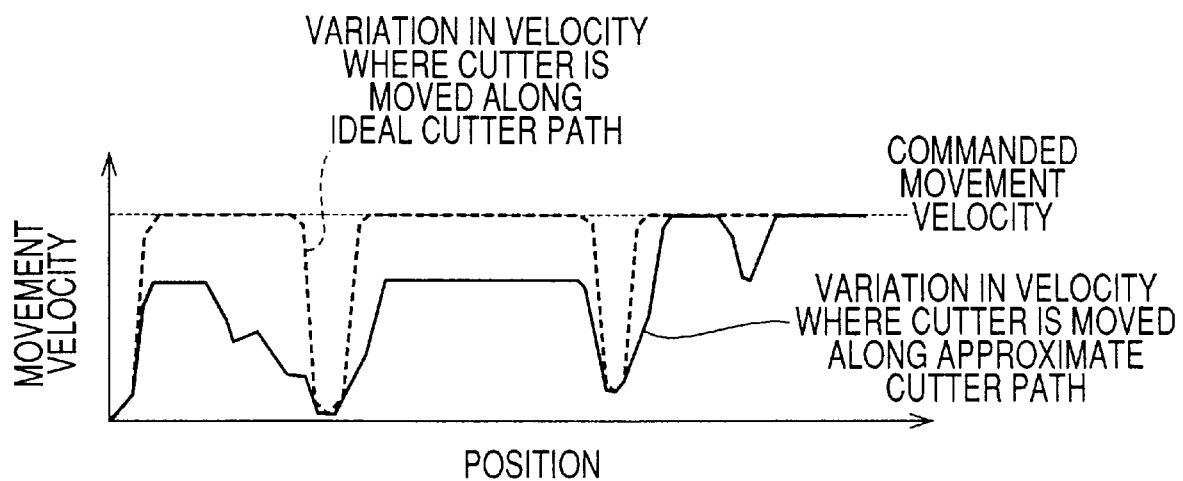
FIG. 26B is a graph showing a difference in velocity variations in a case where a cutter is moved along the ideal cutter path and in a case where the cutter cutter is moved along the approximate cutter path.
Figure 27A:
FIGS. 27A, 27B and 27C are graphs showing the velocity variations corresponding to various command values of movement velocity in the conventional technique.
Figure 27A:
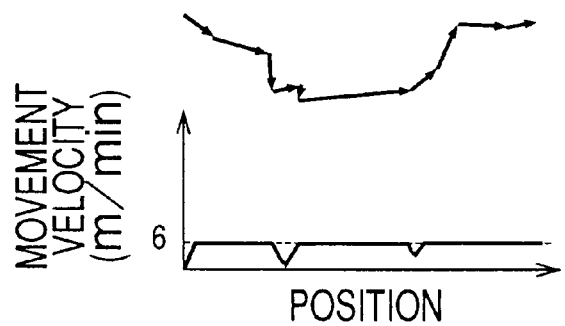
Figure 27B:
Figure 27B:
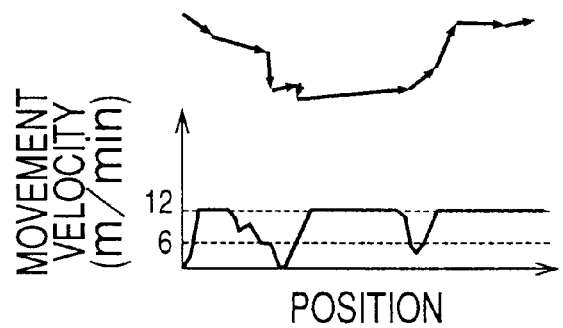
Figure 27C:
Figure 27C:
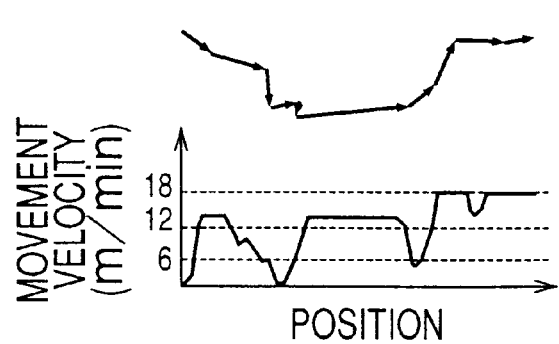
Figure 28:
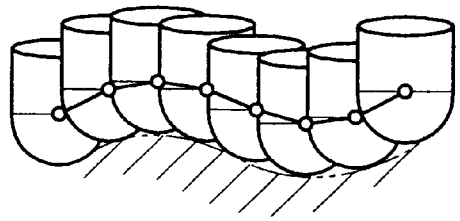
FIG. 28 is a view for explaining a conventional method of obtaining a cutter path on the basis of a desired cutting profile.
Figure 29:
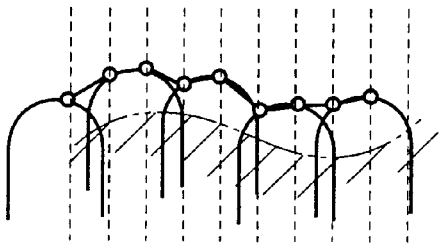
FIG. 29 is a view for explaining another conventional method of obtaining the cutter path on the basis of the desired cutting profile.
Figure 30:
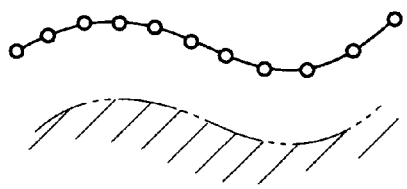
FIG. 30 is a view for explaining an advantageous effect of curve defining functional equations representative of curves which define the cutter paths in the present invention.

The CAM data processing step is implemented by a CAM processor in the form of a CAM computer 20 as shown in FIG. 23. As shown in FIG. 3, the computer 20 includes a data processor 22 such as a CPU (central processing unit), and a memory device 24 such as a ROM and a RAM. The computer 20 is connected to an external memory device 26 operable with a suitable data storage medium 28 such as a floppy disk. An appropriate program stored in the data storage medium 28 is read into the memory device 24 of the computer 20, and is temporarily stored in the memory device 24, so that the program is executed as needed by the data processor 22, to generate the cutter path data representative of the discrete cutter path definition points, on the basis of the part geometry data, and to convert the cutter path data into the corresponding NC data.

The computer 20 is also connected to an input device 30 such as a keyboard or a mouse, through which the operator inputs various commands into the computer 20. An output device 32 such as a CRT, a liquid crystal display and a printer is connected to the computer 20, so that data obtained during data processing by the computer 20 or a result of the data processing are provided on the output device 32.

Figure 4:
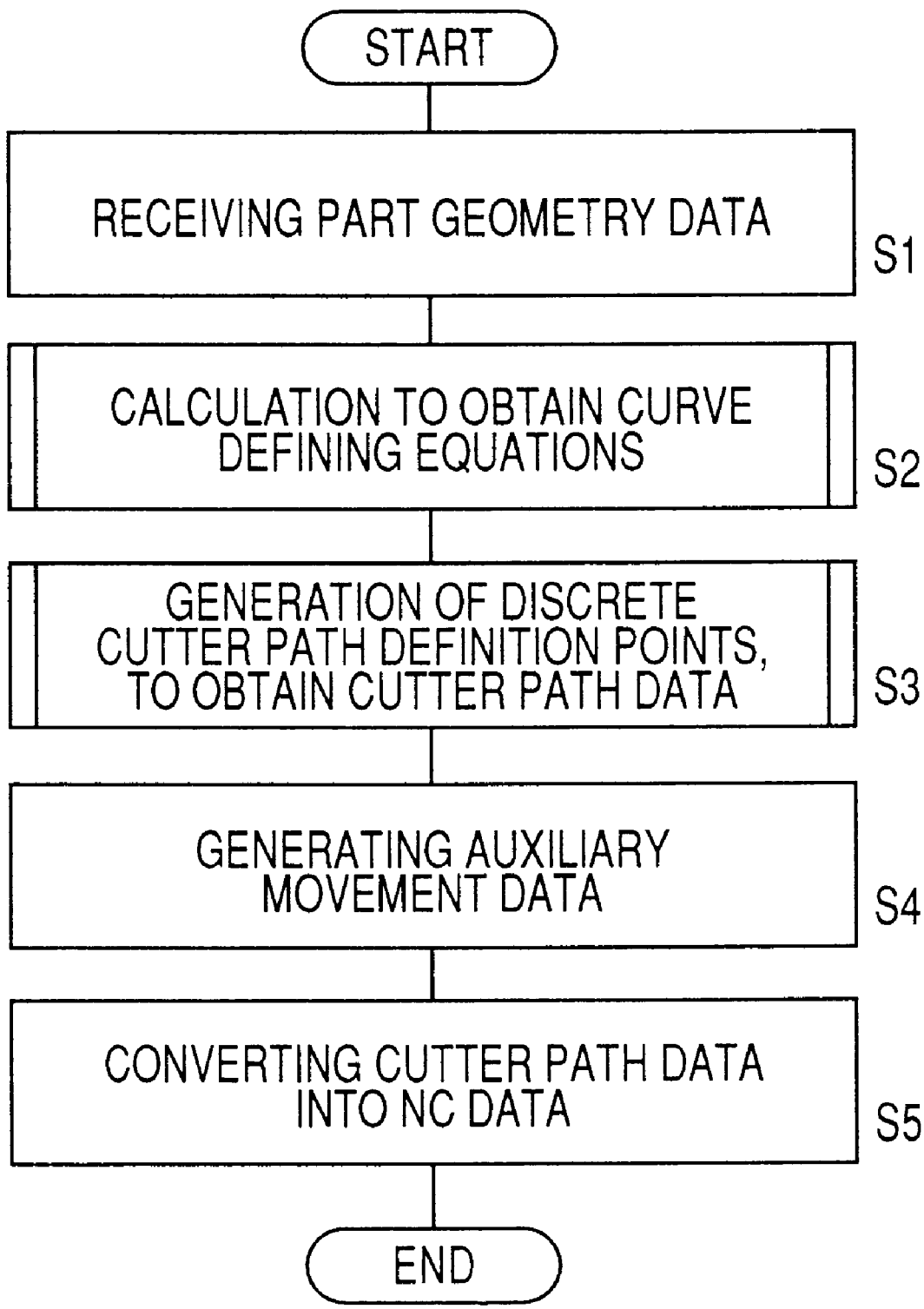
FIG. 4 is a flow chart illustrating a program which is executed as needed by a computer of the apparatus of FIG. 3 and which is stored in a data storage medium in an external memory device of the apparatus.

A routine illustrated in the flow chart of FIG. 4 is executed by the data processor 22 of the CAM computer 20 according to the program stored in the memory device 24.

The routine of FIG. 4 is initiated with step S1 at which a condition or conditions required for generating the discrete cutter path definition points is/are inputted to the CAM computer 20 by the operator through the input device 30. Step S1 is followed by step S2 at which an equation generating program is read out from the external memory device 26 into the memory device 24 of the CAM computer 20, and is executed by the data processor 22, to generate the curve defining equations on the basis of the part geometry data and the cutter data described above.

Figure 5:
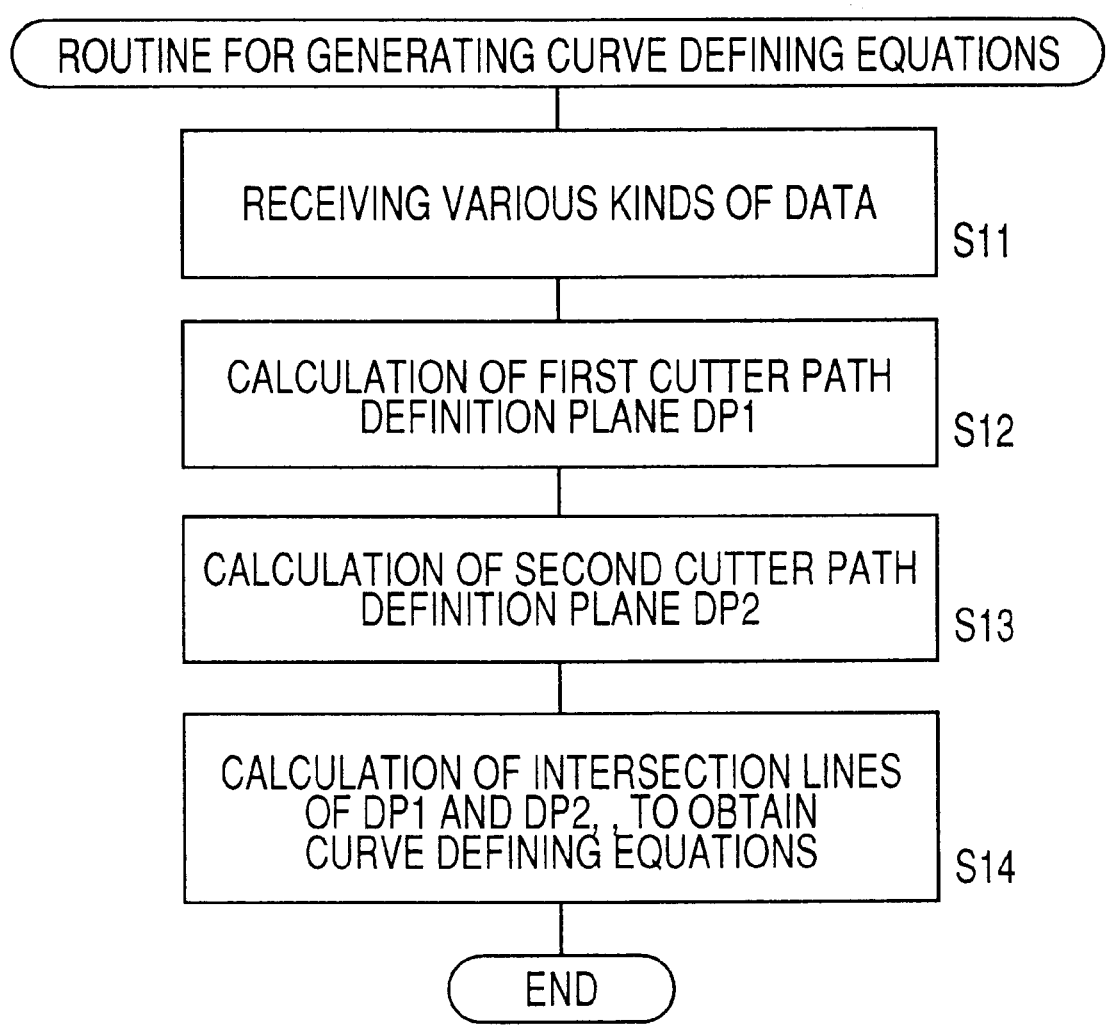
FIG. 5 is a flow chart illustrating a routine for generating curve defining equations, which is executed in step S2 of the flow chart of FIG. 4.

An example of a routine executed according to the equation generating program is illustrated in the flow chart of FIG. 5.

The routine of FIG. 5 is initiated with step S11 at which the CAM computer 20 receives various kinds of data such as the part geometry data and the cutter radius data.

Then, the control flow goes to step S12 at which a first cutter path definition plane DP1 is calculated on the basis of the part geometry data and the cutter radius data. The first cutter path definition plane DP1 is offset by a distance determined by the radius of the cutter, away from the desired cutting profile of the workpiece 18 represented by the part geometry data, in the normal direction of the desired cutting profile. A cutter path along which the cutter 16 is moved is defined as a line of intersection between two cutter path definition planes. One of these two planes is the first cutter path definition plane DP1 which is offset away from the desired cutting profile of the workpiece 18 by the distance determined by the cutter radius, in the normal direction of the desired cutting profile of the workpiece.

Step S12 is followed by step S13 at which a plurality of second cutter path definition planes DP2 are calculated. For obtaining the desired cutting profile of the workpiece 18, the cutter 16 has to be moved along a plurality of cutter paths which are located on the first cutter path definition plane DP1. Thus, at the end of each of the cutter paths, the cutter is moved by a predetermined distance (hereinafter referred to as an "in-feed distance") in a direction perpendicular to the direction of the cutter path, and the cutter is moved along the subsequent cutter path. The plurality of second cutter path definition planes DP2 are calculated on the basis of the in-feed distance. Described more specifically, a plurality of flat or curved planes which are spaced apart from each other by a distance equal to the in-feed distance is obtained as the second cutter path definition planes DP2.

Then, the control flow goes to step S14 to obtain the lines of intersection between the first cutter path definition plane DP1 and the second cutter path definition planes DP2. These lines of intersection correspond to the plurality of cutter paths. Curve defining equations representative of these cutter paths are obtained. For example, the curve defining equations represent Bezier curves. The plurality of cutter paths are indicated by arrow-headed lines in FIG. 6, by way of example. In this specific example of FIG. 6, the second cutter path definition planes DP2 are curved plane. It is noted that step S14 is formulated to obtain the curve defining equations which represent respective segments that are connected to each other to define the cutter path.

Figure 7:
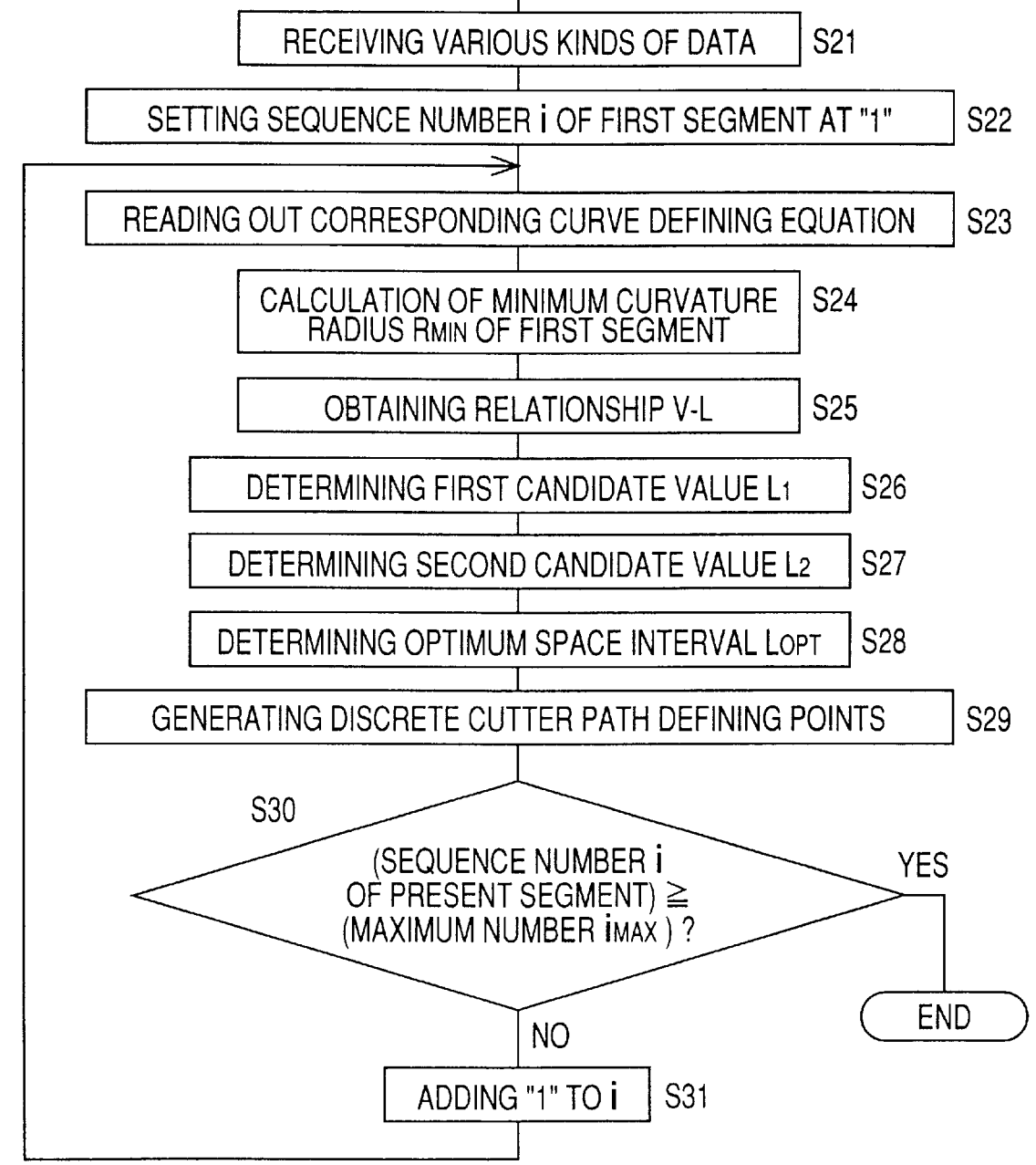
FIG. 7 is a flow chart illustrating a routine for generating discrete cutter path definition points in step S3 of the flow chart of FIG. 4.

After the curve defining equations have been obtained as described above, a discrete point generating program is transferred from the external memory device 26 into the memory device 24 of the CAM computer 20, and is executed by the data processor 22. As a result, a routine illustrated in the flow chart of FIG. 7 is executed according to the corresponding discrete point generating program. This routine of FIG. 7 is repeatedly executed for each segment of the plurality of cutter paths.

The routine of FIG. 7 is initiated with step S21 at which the operator inputs various kinds of data required for calculating the space interval L of the discrete cutter path definition points, into the CAM computer 20. The various kinds of data include the upper limit $G_P$ of the actual centrifugal acceleration, the maximum data amount b which can be transferred from the DNC 10 to the CNC 12 in a predetermined time, the data amount B of the one line of the NC data, the required time t for processing data amount corresponding to the one motion of cutter 16, the upper limit $\Delta V_P$ of variation in the feed rate, and the command value $V_D$ for the resultant movement velocity.

Step S21 is followed by step S22 at which a sequence number i of a first segment is set at "1 (one)". The first segment refers to one of the segments for which the discrete points are first generated through the present routine.

Then, step S23 is implemented to read out one of the curve defining equations which represents the first segment, from the memory device 24.

Figure 10:
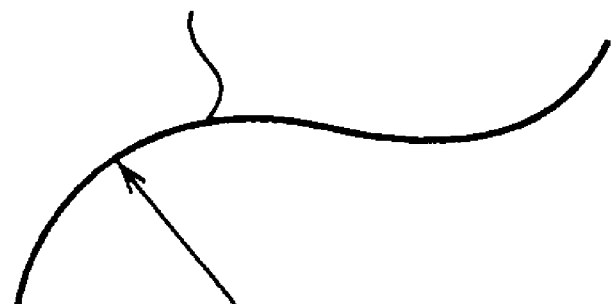
FIG. 10 is a perspective view schematically illustrating an operation in step S27 of the flow chart of FIG. 7.
Figure 10:
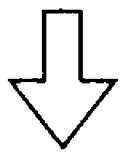
Figure 10:
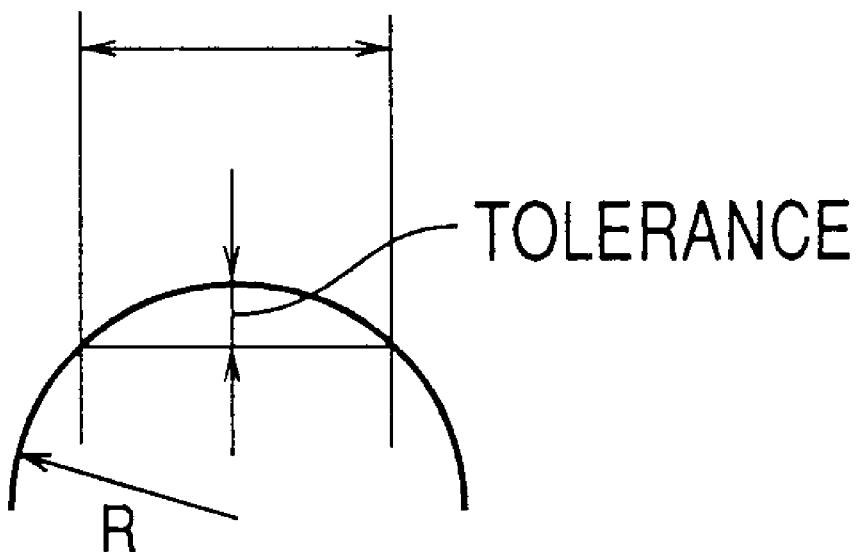

Step S23 is followed by step S24 at which a minimum curvature radius $R_{MIN}$ of the first segment is calculated on the basis of the curve defining equation which has been read out from the memory device 24 at step 23, as shown in FIG. 10. The minimum curvature radius $R_{MIN}$ may be a curvature radius of one of curved portions of the first segment which has the smallest radius.

Figure 9A:
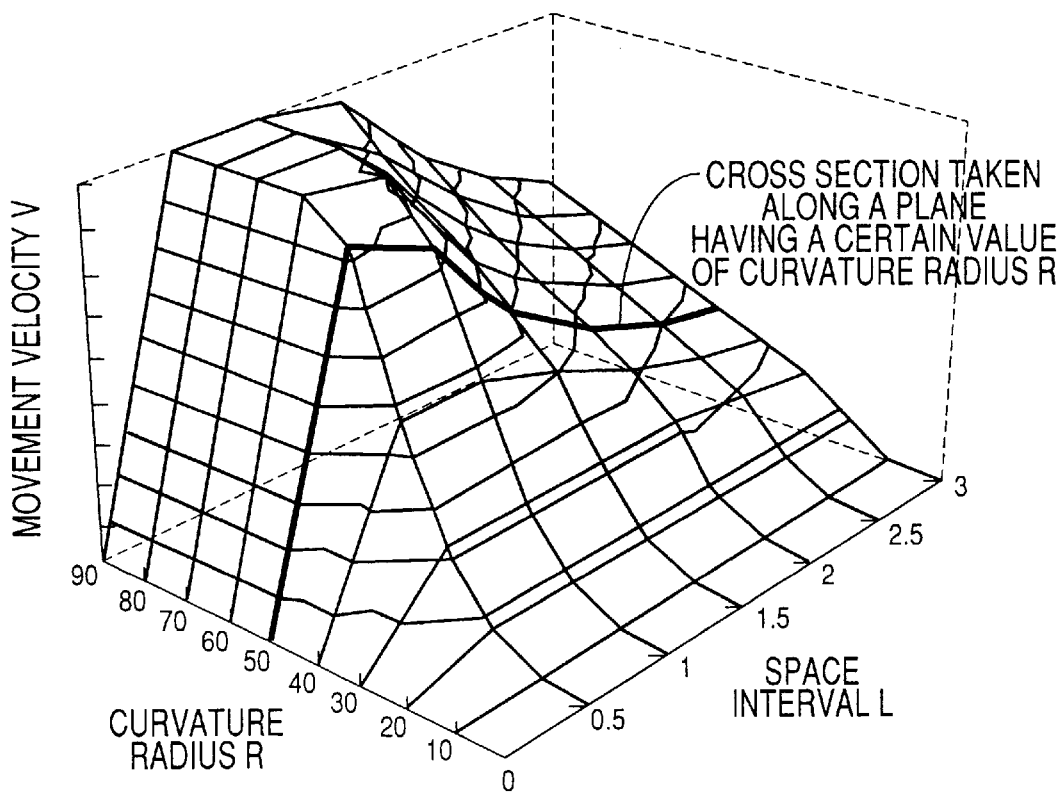
FIGS. 9A and 9B are graphs for explaining operations in steps S25 and S26 of the flow chart of FIG. 7.
Figure 9A:
Figure 9B:
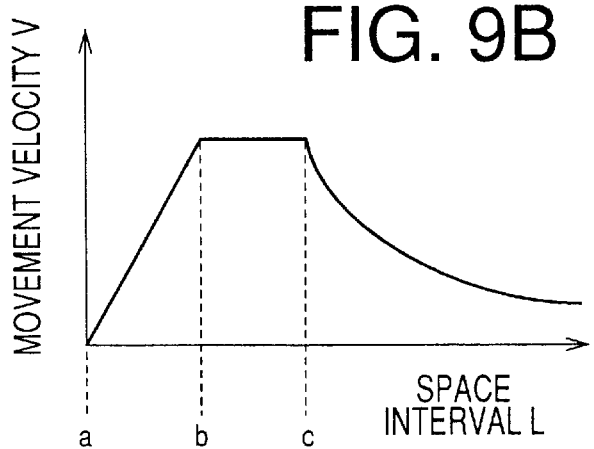

Then, step S25 is implemented to calculate the above-described four equations on the basis of the calculated minimum curvature radius $R_{MIN}$ and the inputted various kinds of data, so as to obtain a relationship between the resultant movement velocity V and the space interval L when the curvature radius R takes the calculated value (hereinafter referred to as a "relationship V-L"). The relationship V-L can be expressed by a two-dimensional graph which is shown in FIG. 9B. This two-dimensional graph is equivalent to a cross-section of a three-dimensional graph which is shown in FIG. 9A, and which is the same graph as FIG. 2. The cross-section is taken along a plane on which the curvature radius R takes the calculated value.

Step S25 is followed by step S26 to determine a first candidate value $L_1$ of the space interval L on the basis of the relationship V-L. The first candidate value $L_1$ is determined as a value of the space interval L where the movement velocity V takes the highest value in the relationship V-L. In the two-dimensional graph shown in FIG. 9B, the first space candidate value $L_1$ ranges from b to c.

Then, step S27 is implemented to obtain a linear segment which is intended to approximate to an arc having the calculated value of the curvature radius R such that an amount of deviation of the linear segment from the arc is equal to a predetermined permissible maximum amount, as shown in FIG. 10, and calculate a distance between two intersection points of the linear segment and the arc. The distance is determined as a second candidate value $L_2$ of the space interval. That is, the second candidate value $L_2$ is determined based upon the amount of deviation of the linear segment from the arc, while the first candidate value $L_1$ is determined based upon the above-described relationship V-L.

Then, at step S28, one of the first and second candidate values $L_1$, $L_2$ which is smaller than the other is determined as an optimum space interval $L_{OPT}$.

Figure 11:
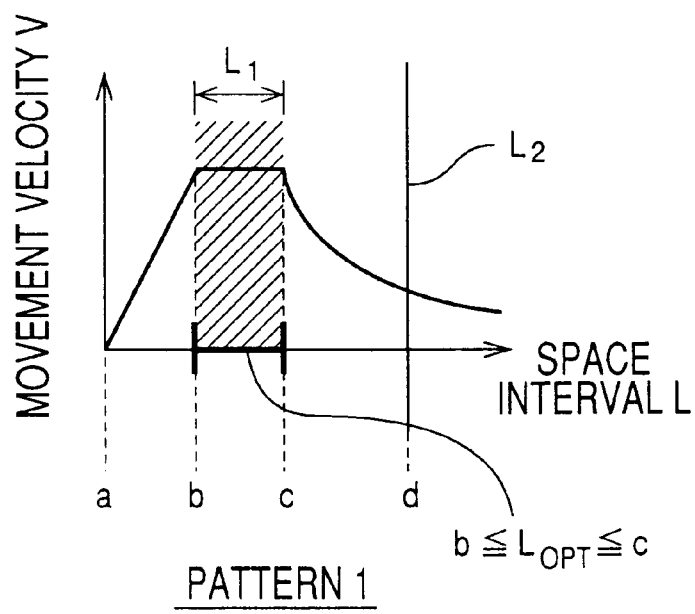
FIGS. 11, 12, 13, 14 and 15 are graphs for explaining an operation in step S28 of the flow chart of FIG. 7.

In a pattern 1, as shown in FIG. 11, where the first candidate value $L_1$ ranges from b to c ($b \leq L_1 \leq c$), and where both of the b and c are smaller than the second candidate value $L_2$ equal to d ($b<d=L_2$, $c<d=L_2$), the optimum space interval $L_{OPT}$ may be determined as any one of the b which is the lower limit of the first candidate value $L_1$, the c which is the upper limit of the first candidate value $L_1$, and the average value of the b and c.

Figure 12:
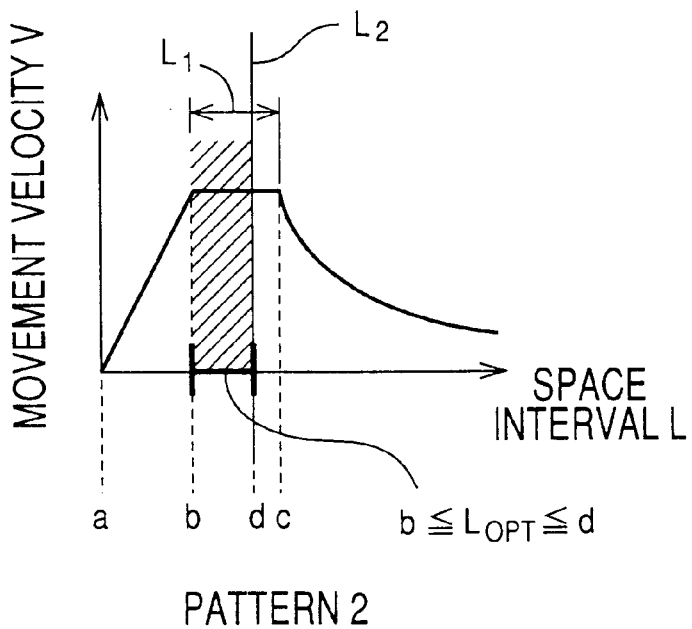

In a pattern 2, as shown in FIG. 12, where the first candidate value $L_1$ ranges from b to c ($b \leq L_1 \leq c$), and where the b is smaller than the second candidate value $L_2$ equal to d while the c is larger than the d ($b<d=L_2<d$), the optimum space interval $L_{OPT}$ may be determined as any one of the b which is the lower limit of the first candidate value $L_1$, the d which represents the second candidate value $L_2$, and the average value between the b and d.

Figure 13:
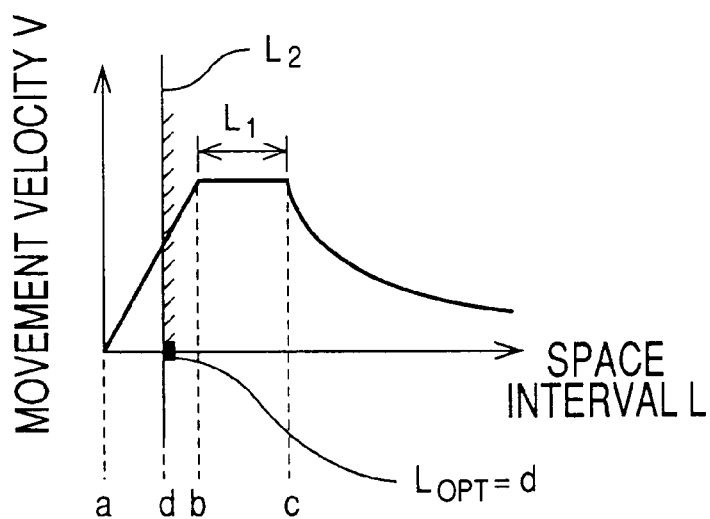

In a pattern 3, as shown in FIG. 13, where the first candidate value $L_1$ ranges from b to c ($b \leq L_1 \leq c$), and where both of the b and c are larger than the second candidate value $L_2$ equal to d ($d=L_2<b$, $d=L_2<c$), the optimum space interval $L_{OPT}$ is determined as the d which represents the second candidate value $L_2$.

Figure 14:
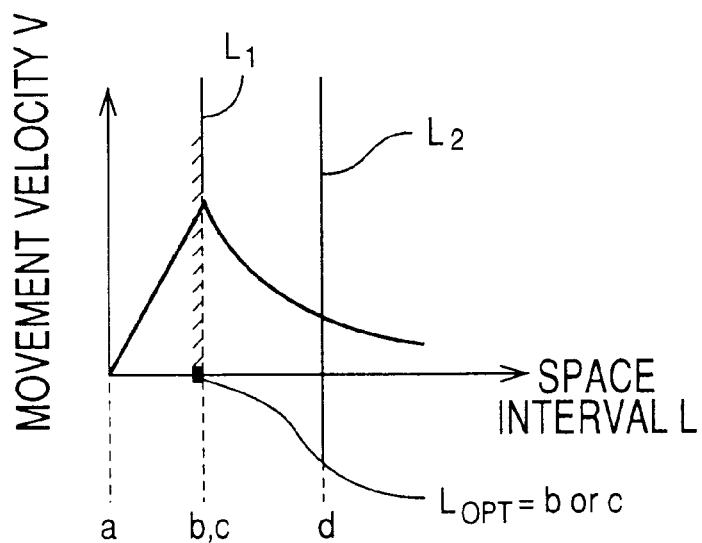

In a pattern 4, as shown in FIG. 14, where the first candidate value $L_1$ consists of a single value ($L_1=b=c$), and where the first candidate value $L_1$ is smaller than the second candidate value $L_2$ equal to d ($b<d=L_2$, $c<d=L_2$), the optimum space interval $L_{OPT}$ is determined as the the first candidate value $L_1$.

Figure 15:
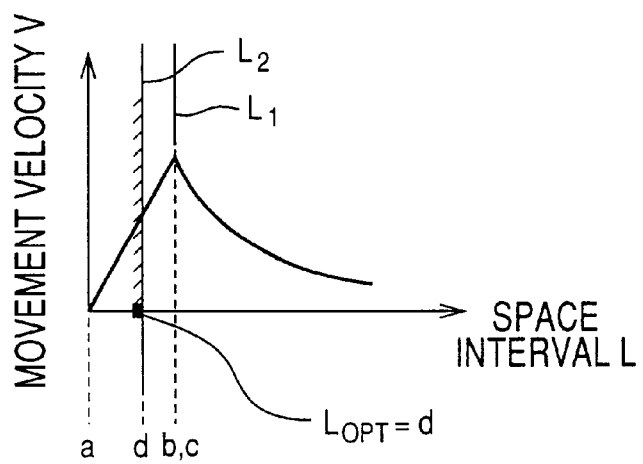

In a pattern 5, as shown in FIG. 15, where the first candidate value $L_1$ consists of a single value ($L_1=b=c$), and where the first candidate value $L_1$ is larger than the second space interval $L_2$ equal to d ($d=L_2<b$, $d=L_2<c$), the optimum space interval $L_{OPT}$ is determined as the d which represents the second candidate value $L_2$.

After the optimum space interval $L_{OPT}$ has been determined at step S28 as described above, step S29 is implemented to generate the discrete cutter path definition points which lie on the first segment and which are spaced apart from each other by the distance equal to the determined optimum space interval $L_{OPT}$.

Figure 16:
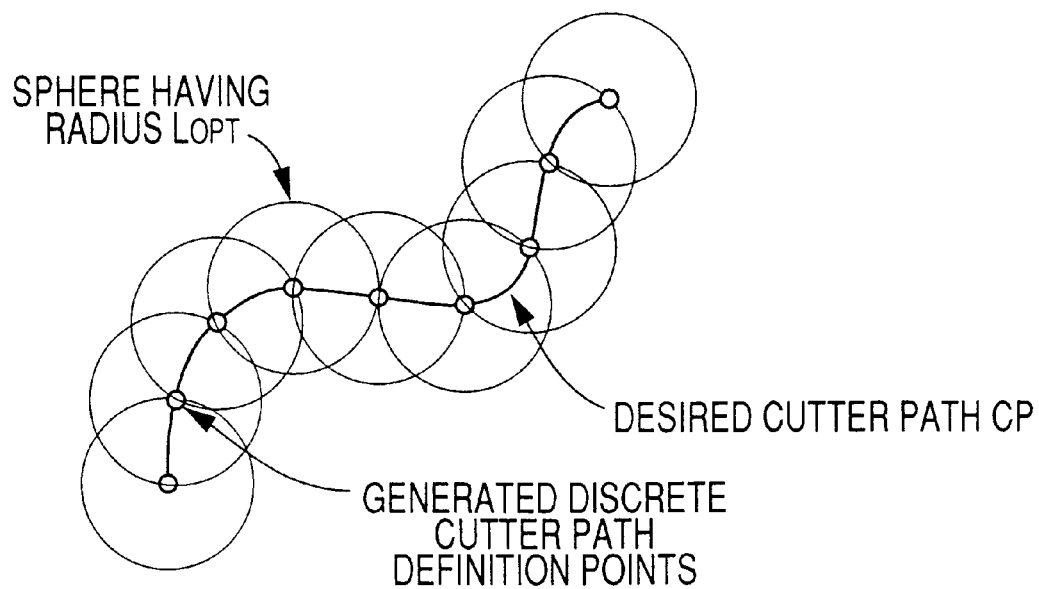
FIG. 16 is a perspective view schematically illustrating an operation in step S29 of the flow chart of FIG. 7.

Described more specifically referring to FIG. 16, a sphere having a radius equal to the determined optimum space interval $L_{OPT}$ is moved such that the center of the sphere is held on the segment in question of the desired cutter path. Initially, the center of the sphere is located at one end of the segment in question. The position of this one end of the segment in question is determined as the first discrete cutter path definition point lying on the segment in question. Then, the sphere is moved by the distance equal to its radius $L_{OPT}$. One of the two points of intersection between the sphere and the segment in question which is remote from the above-indicated one end of the segment in question is determined as the second discrete cutter path definition point. The movement of the sphere and the determination of the point of intersection are repeated until the point of intersection remote from the above-indicated one end of the curved segment in question lies on the subsequent segment. Thus, the discrete cutter path definition points on the first segment are generated in the first cycle of execution of the routine of FIG. 7.

Usually, the point of intersection of the sphere and the desired cutter path which is obtained by the last movement of the sphere along the present segment does not lie on the other end of the present segment. In this case, this point of intersection is not used as the last discrete cutter path definition point obtained for the present segment, but the above-indicated other end of the present segment is determined as the last discrete cutter path definition point. Thus, all end points of the respective segments are determined as the discrete cutter path definition points.

However, the last generated point of intersection which lies on the subsequent segment may be determined as the last discrete cutter path definition point for the present segment. In this case, the end point of the present segment is not used as the discrete cutter path definition point.

Then, step S30 is implemented to judge whether the sequence number i of the present segment is equal to or larger than a maximum number $i_{MIN}$ which represents the number of all the segments constituting the desired cutter path in question. If the sequence number i is smaller than the maximum number $i_{MIN}$ a negative judgement is obtained at step S30. The negative judgement at step S30 is followed by step S31 at which the sequence number i of the segment is added by "1 (one)", and then the control flow goes back to step S23 and the following steps, so as to generate the discrete cutter path definition points for the subsequent segment whose sequence number (i+1). Steps S23–S31 are repeatedly implemented for each of the segments of the desired cutter path until a positive judgement is obtained at step S30.

Figure 6:
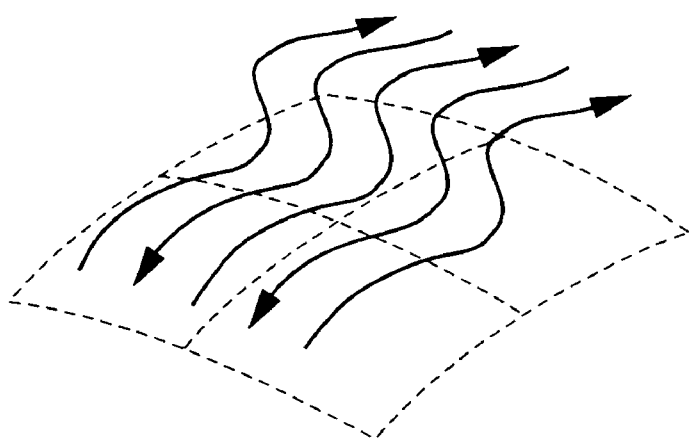
FIG. 6 is a perspective view schematically illustrating an operation in step S2 of the flow chart of FIG. 4.
Figure 8:
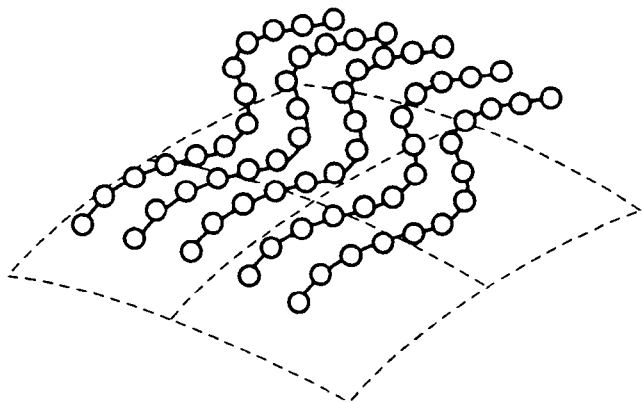
FIG. 8 is a perspective view schematically illustrating an operation in step S3 of the flow chart of FIG. 4.

If the routine is repeatedly executed for each of the plurality of desired cutter paths as shown in FIG. 6, a plurality of lines of discrete cutter path definition points are generated on the plurality of desired cutter paths as shown in FIG. 8.

Figure 17:
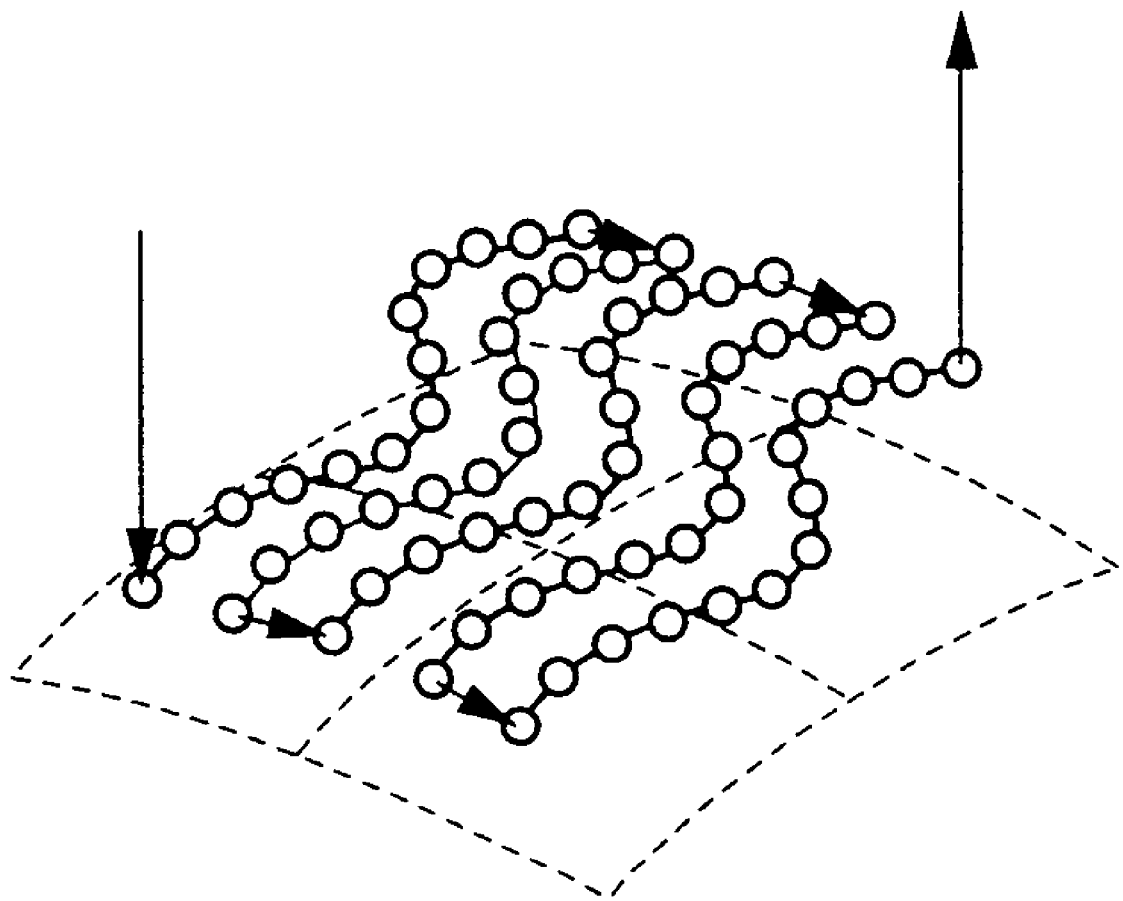
FIG. 17 is a perspective view schematically illustrating an operation in step S4 of the flow chart of FIG. 4.

After the discrete cutter path definition points on the desired cutter paths have been generated at the routine S21–S31 as described above, the control flow goes to step S4 of FIG. 4, at which auxiliary movement data are generated to control auxiliary movements of the cutter 16 that are necessary to permit the cutting operation to be performed according to the cutter path data representative of the discrete cutter path definition points. The auxiliary movement data include, for example, data for a non-cutting movement (rapid traverse movement) of the cutter 16 from a predetermined position (e.g., machine home position) to a machining start position, data for a non-cutting movement (rapid traverse movement) of the cutter 16 from a machining end position to the predetermined position, and data for a movement over the in-feed distance of the cutter 16 from the position of one of the cutter paths to the subsequent one of the cutter paths, as indicated by arrow-headed lines in FIG. 17.

Then, the control flow goes to step S5 at which the cutter path data are converted into NC data that can be processed by the CNC 12. Thus, one cycle of execution of the routine of FIG. 4 is completed.

Figure 18:
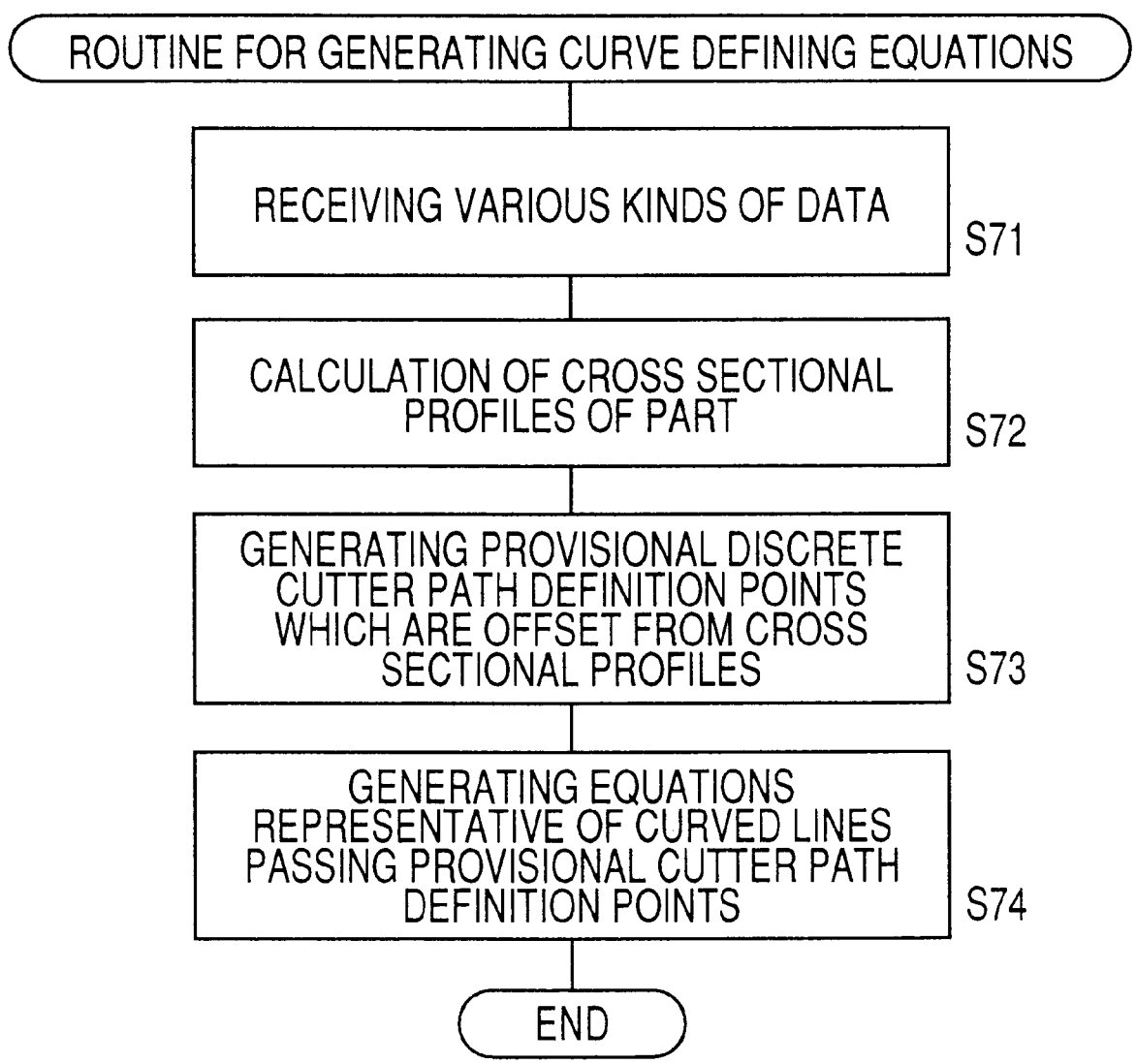
FIG. 18 is a flow chart illustrating a routine which is executed by a computer adapted to practice a cutter path data generating process according to a second embodiment of this invention, for generating curve defining equations.

Referring next to FIG. 18, there will be described a second embodiment of this invention.

In the routine for generating curve defining equations shown in FIG. 5 of the first embodiment, the curve defining equations are generated directly on the basis of the part geometry data, and the discrete cutter path definition points are generated on the basis of the curve defining equations. In a routine for generating curve defining equations shown in FIG. 18 of the present second embodiment, provisional discrete cutter path definition points are generated on the basis of the part geometry data, and these provisional discrete points are used to generate the curve defining equations, which are used to generate definitive cutter path definition points.

In the present embodiment, the CAM computer 20 is adapted to execute the routine illustrated in the flow chart of FIG. 18. A program for executing this routine is stored in the data storage medium 28 of the external memory device 26.

The routine of FIG. 18 is initiated with step S71 at which the CAM computer 20 receives various kinds of data such as part geometry data described above, cutter in-feed data representative of the in-feed distance described above, and cutter radius data representative of the radius of the cutter 16.

Step S71 is followed by step S72 to perform calculation to obtain cross sectional profiles of the part on the basis of the data received at step S71. That is, the outer profiles or outlines of the part in equally spaced-apart cross sectional planes are obtained. The cross sectional planes are spaced from each other by a distance equal to the in-feed distance.

Then, the control flow goes to step S73 to generate provisional discrete cutter path definition points on the basis of the cross sectional profiles of the part and the radius of the cutter 16. These provisional discrete cutter path definition points are offset away from the cross sectional profiles by a distance determined by the cutter radius, in the normal direction of the workpiece 18, and are substantially equally spaced apart from each other by a predetermined small distance.

Step S74 is then implemented to generate a functional equation representative of a curved line (e.g., Bezier curve) which passes the provisional discrete cutter path definition points obtained at step S73. This functional equation is obtained for each of segments of each desired cutter path.

Then, definitive discrete cutter path definition points are generated in the same manner as in the first embodiment.

Figure 19:
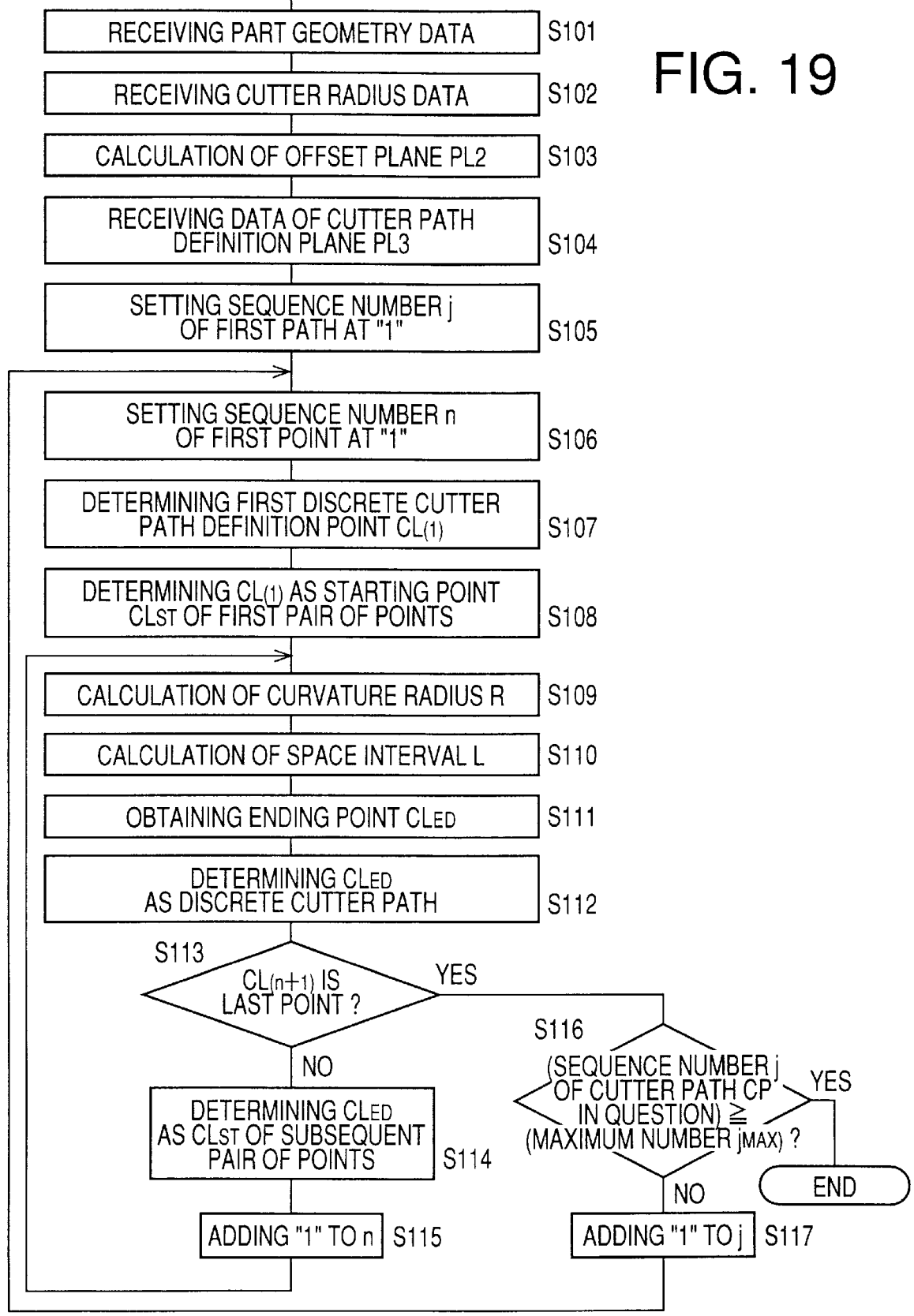
FIG. 19 is a flow chart illustrating a routine which is executed by a computer adapted to practice a cutter path data generating process according to a third embodiment of this invention, for generating discrete cutter path definition points.

Referring next to FIG. 19, there will be described a third embodiment of this invention. The present embodiment is identical with the first and second embodiments except for the program for generating the discrete cutter path definition points, which program will be described below.

Figure 20:
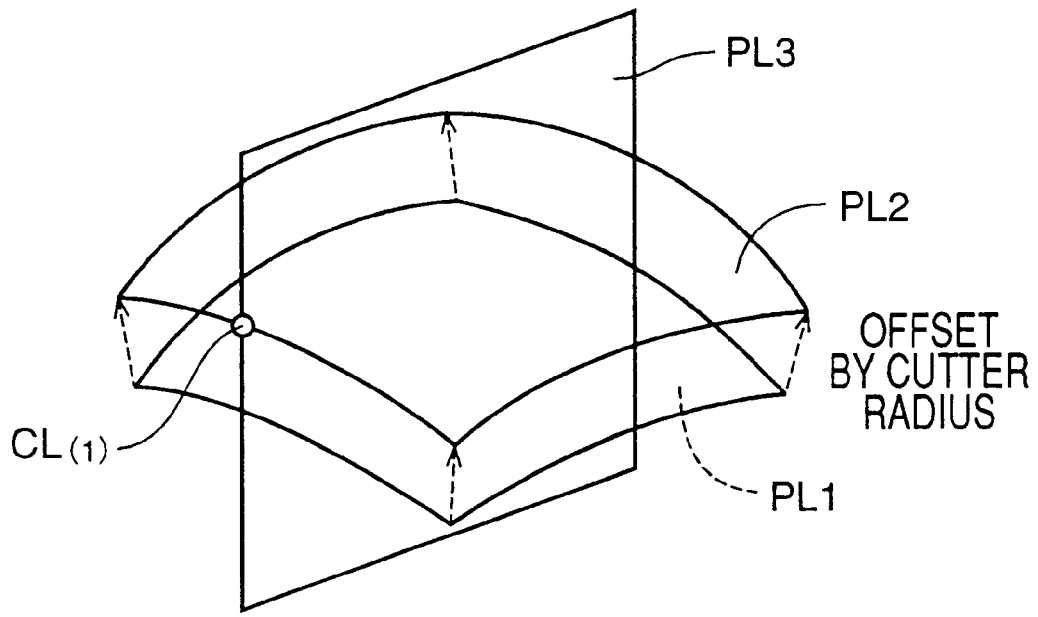
FIG. 20 is a perspective view schematically illustrating operations in steps S103 and S107 of the flow chart of FIG. 19.

FIG. 19 shows the discrete point generating program executed in the present embodiment. The routine of the program is initiated with step S101 at which the operator inputs part geometry data representative of a desired cutting plane PL1 of the workpiece 18, into the CAM computer 20. Then, at step S102, the cutter size data in the form of cutter radius data are inputted into the CAM computer 20. Step S102 is followed by step S103 at which an offset plane PL2 is calculated on the basis of the part geometry data and the cutter radius data. The offset plane PL2 is a plane which is offset away from the desired cutting plane PL1 by a distance equal to a radius of the cutter 16, in the normal direction of the desired cutting plane PL1, as shown in FIG. 20. Then, the control flow goes to step S104 at which the operator inputs data representative of a cutter path definition plane PL3, into the CAM computer 20. The cutter path definition plane PL3 is defined by a reference line passing through a reference point of the cutter 16 and a cutting point of the cutter 16 during the movement of the cutter 16. That is, the offset plane PL2 and the cutter path definition plane PL3 correspond to the first cutter path definition plane DP1 and the second cutter path definition plane DP2 in the first embodiment, respectively.

Step S104 is followed by step S105 at which a sequence number j of a first path is set at "1 (one)". The first path refers to one of the plurality of desired cutter paths for which the discrete points are first generated through the present routine.

Then, the control flow goes to S106 at which a sequence number n of a first point is set at "1 (one)". The first point refers to one of the plurality of discrete points of the desired cutter path in question, which point is to be first obtained. Step S106 is followed by step S107 at which the first point $CL_{(1)}$ is determined as one of points located at opposite ends of the intersection line of the offset plane PL2 and the cutter path definition plane PL3, as shown in FIG. 20. At this step, however, the operator may select any one of the two points as the first point $CL_{(1)}$. Then, step S107 is followed by step S108 at which the first point $CL_{(1)}$ is determined as a start point $CL_{ST}$ of a first pair of points, which is one of a plurality of pairs of points, and which is to be first generated. The plurality of pairs of points constitute the discrete points to be located on the desired cutter path in question. Each of the pairs consists of adjacent two of the discrete points.

Figure 21:
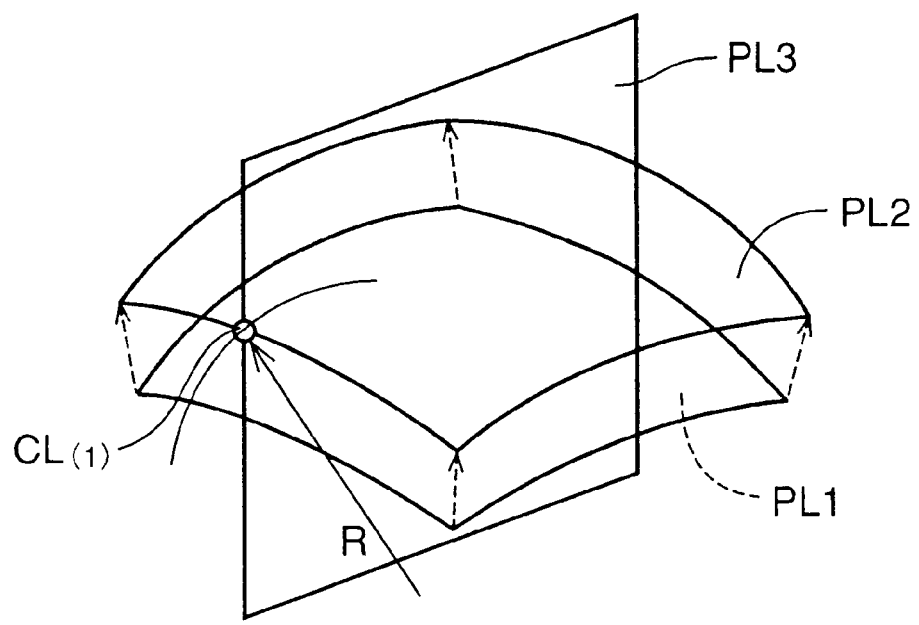
FIG. 21 is a perspective view schematically illustrating an operation in step S109 of the flow chart of FIG. 19.

Then, the control flow goes to step S109 at which a curvature radius R is calculated. The calculated curvature radius R is a curvature radius of a portion of the offset plane PL2, on which portion the start point $CL_{ST}(CL_{(1)})$ is located, as shown in FIG. 21. In the first and second embodiments, the curvature radiuses R have been calculated according to the curve defining equations at step S24. However, in the present embodiment, the curvature radius R is calculated on the basis of the part geometry data, data representative of the cutter path definition planes and data representative of the start point $CL_{ST}$, without the curve defining equations.

Then, the control flow goes to step S110 at which a space interval between the start point $CL_{ST}$ ($CL_{(1)}$) and the subsequent point is calculated by taking account of the machining ability of the machine 14, i.e., the above-described relationship V-L of the machine 14, as in the first and second embodiments. However, in the present embodiment, a space interval like the second candidate value $L_2$ determined based upon the deviation amount at step S27 of the first and second embodiments is not calculated. Thus, the same procedures as performed at steps S25, S26 and S28 shown in FIG. 7 are performed at this step S110. Where the space interval calculated by taking account of the relationship V-L consists of a single value, the single value is determined as a definitive space interval L. On the other hand, where the calculated space interval consists of a plurality of values, one of the maximum value, the minimum value and the average value is determined as the definitive space interval L.

Figure 22:
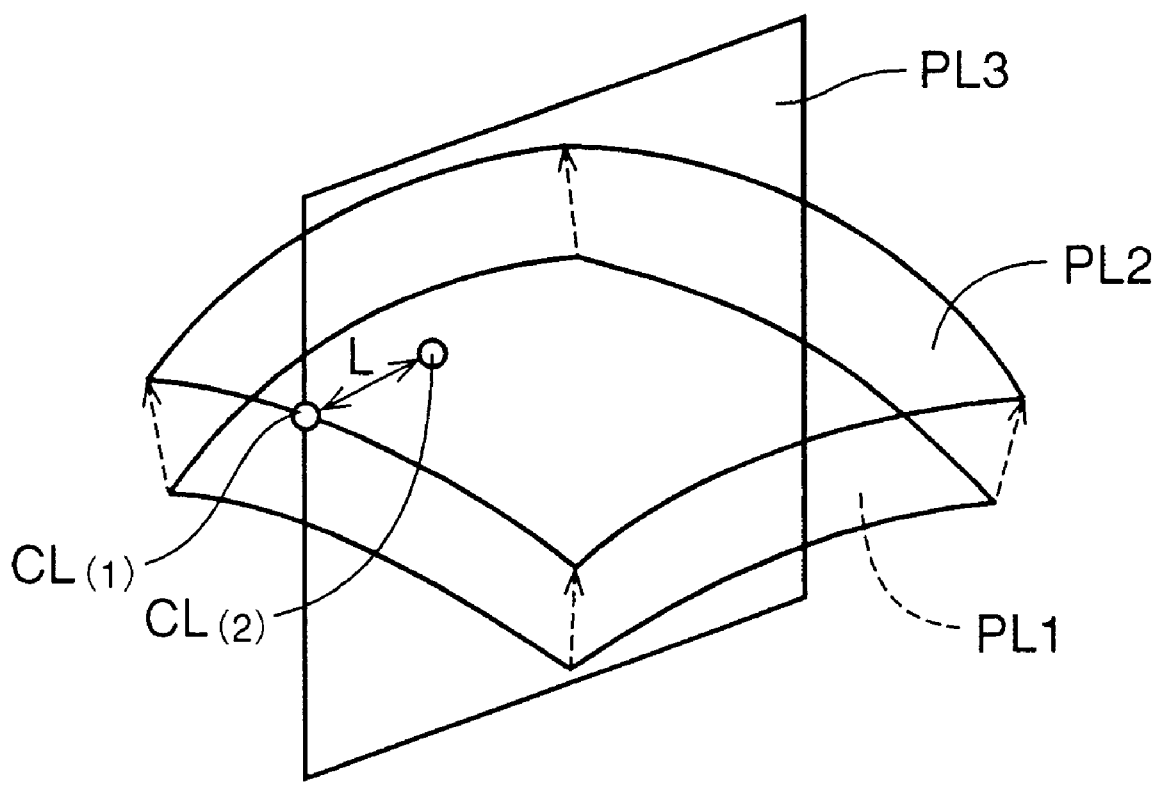
FIG. 22 is a perspective view schematically illustrating an operation in step S111 of the flow chart of FIG. 19.

Then, the control flow goes to step S111 at which the above-described subsequent point is determined as an end point $CL_{ED}$ ($CL_{(2)}$) of the first pair of points. The end point $CL_{ED}$ is located on the offset plane PL2 and on the cutter path definition plane PL3, and is spaced apart from the start point $CL_{ST}$ ($CL_{(1)}$) by a distance equal to the definitive space interval L, as shown in FIG. 22.

Step S111 is followed by step S112 at which the end point $CL_{ED}$ is determined as a discrete cutter path definition point $CL_{(n+1)}$ having a sequence number (n+1). Then, step S113 is implemented to judge whether the end point $CL_{ED}$ corresponds to the last point of the desired cutter path in question or not. If a negative judgement is obtained at step S113, step S114 is implemented to determine the end point $CL_{ED}$ as a start point $CL_{ST}$ of the subsequent pair of points. Then, the control flow goes to step S115 at which the sequence number n of the point is added by "1 (one)". Step S115 is followed by step S109.

Steps S109 through S115 are repeatedly implemented until a positive judgement is obtained at step S113. If the positive judgement is obtained at step S113, step S116 is implemented to determine a sequence number j of the desired cutter path in question is equal to or larger than the maximum number $j_{MAX}$. If a negative judgement is obtained at step S116, the control flow goes to step S117 at which the sequence number j is added by "1 (one)". Step S117 is followed by step S106.

If all of the discrete cutter path definition points have been generated, that is, if a positive judgement is obtained at step S116, one cycle of execution of the routine of FIG. 19 is completed.

While the present invention has been described in detail in its presently preferred embodiments, by reference to the accompanying drawings, it is to be understood that the invention is not limited to the details of the illustrated embodiments, but may be embodied with various changes, modifications and improvements, which may occur to those skilled in the art, without departing from the spirit and scope of the invention defined in the following claims:

What is claimed is:

1. A process of generating a succession of discrete points to be followed by a cutter, so as to move said cutter along a desired cutter path, comprising:

(a) a step of calculating a first space interval of said discrete points in the direction of said succession on the basis of a curvature radius of said desired cutter path, according to a relationship among said curvature radius, said first space interval and movement velocity of said cutter, such that said movement velocity is enlarged as much as possible; and (b) a step of generating said discrete points on the basis of said first space interval, such that said discrete points are spaced apart from each other by a distance equal to said first space interval in the direction of said succession.

2. A process according to claim 1, wherein said succession of discrete points are to be followed by a reference point of said cutter during movement of said cutter, said reference point being spaced from a cutting point of said cutter, and wherein said step of calculating said first space interval comprises a step of calculating said curvature radius on the basis of at least a desired cutting profile into which a workpiece is to be machined with said cutter being moved along said desired cutter path, and optionally a cutter path definition plane which is defined by a reference line passing through both of said reference point and said cutting point during said movement of said cutter, and a cutter size which represents a radial distance between said reference point and said cutting point.

3. A process according to claim 2, wherein said step of calculating said curvature radius comprises:

(a) a step of calculating said desired cutter path on the basis of said desired cutting profile, said cutter path definition plane and said cutter size; and (b) a step of calculating said curvature radius on the basis of said desired cutter path.

4. A medium having a computer program for executing a process defined in claim 3, such that the computer program is readable by a computer.

5. A process according to claim 2, wherein said step of calculating said curvature radius comprises:

(a) a step of calculating a offset plane which is offset away from said desired cutting profile by radial distance in the normal direction of said desired cutting profile, on the basis of said desired cutting profile and said cutter size; and (b) a step of calculating an intersection line of said offset plane and said cutter path definition plane, and calculating a curvature radius of a segment of said intersection line on which segment a predetermined point is located, as said curvature radius of said desired cutter path.

6. A medium having a computer program for executing a process defined in claim 5, such that the computer program is readable by a computer.

7. A medium having a computer program for executing a process defined in claim 2, such that the computer program is readable by a computer.

8. A process according to claim 1, wherein said succession of discrete points is to be followed by a reference point of said cutter during said movement of said cutter, said reference point being spaced from a cutting point of said cutter, and wherein said step of generating said discrete points is performed without calculating said desired cutter path, said step of generating said discrete points comprising:

(a) a step of determining a position of a first point which is one of said discrete points and which is to be first generated;

(b) a step of determining said first point as a start point of a first pair of points which is one of a plurality of pairs of points and which is to be first generated, said plurality of pairs of points constituting said discrete points, each of said pair of points consisting of adjacent two of said discrete points;

(c) a step of generating an end point of said first pair of points, on the basis of said position, said first interval and the direction of said succession; and (d) a repeat step of determining an end point of each one of said plurality of pairs of points, as a start point of the subsequent pair of points, and generating an end point of the subsequent pair of points, on the basis of a position of said start point of the subsequent pair of points, said first interval and the direction of said succession, said repeat step being repeatedly implemented.

9. A process according to claim 8, further comprising a step of determining the direction of said succession on the basis of at least said position and a desired cutting profile into which a workpiece is to be machined with said cutter being moved along said desired cutter path, and optionally a cutter path definition plane which is defined by a reference line passing through both of said reference point and said cutting point during said movement of said cutter, and a cutter size which defines radial distance between said reference point and said cutting point.

10. A medium having a computer program for executing a process defined in claim 9, such that the computer program is readable by a computer.

11. A medium having a computer program for executing a process defined in claim 8, such that the computer program is readable by a computer.

12. A process according to claim 1, wherein said movement velocity is determined on the basis of said curvature radius and said first space interval which are estimated from said discrete points, according to said relationship, and wherein data representative of said discrete points and said movement velocity are supplied to control devices, so that said cutter is moved at said movement velocity by a machine which is controlled by said control devices.

13. A medium having a computer program for executing a process defined in claim 12, such that the computer program is readable by a computer.

14. A process according to claim 1, further comprising:

(a) a step of determining said first space interval as a first candidate value;

(b) a step of calculating a second space interval of said discrete points in the direction of said succession such that a amount of deviation of an approximate cutter path from said desired cutter path is held equal to or smaller than a predetermined permissible maximum amount, said approximate cutter path being defined by straight lines interpolating said discrete points;

(c) a step of determining said second space interval as a second candidate value; and (d) a step of determining one of said first and second candidate values, which is smaller than the other, as an optimum space interval of said discrete points in the direction of said succession.

15. A medium having a computer program for executing a process defined in claim 14, such that the computer program is readable by a computer.

16. A process according to claim 1, further comprising a step of obtaining curve defining functional equations representative of curves each of which defines said desired cutter path on the basis of a desired cutting profile into which a workpiece is to be machined with said cutter being moved along, and wherein said discrete points are generated on the basis of said functional equations and said first space interval of said discrete points.

17. A medium having a computer program for executing a process defined in claim 16, such that the computer program is readable by a computer.

18. A process according to claim 1, wherein said cutter is moved by a machine, said process further comprising a step of determining said relationship such that said relationship satisfies a plurality of different conditions associated with said movement velocity of said cutter, said relationship representing machining ability of said machine.

19. A medium having a computer program for executing a process defined in claim 18, such that the computer program is readable by a computer.

20. A medium having a computer program for executing a process defined in claim 1, such that the computer program is readable by a computer.

* * * * *